(12) United States Patent
Li

(10) Patent No.: US 11,431,216 B1
(45) Date of Patent: Aug. 30, 2022

(54) ELECTRIC MOTOR, GENERATOR AND COMMUTATOR SYSTEM, DEVICE AND METHOD

(71) Applicant: Turboroto, Inc., Santa Clara, CA (US)

(72) Inventor: Ping Li, Santa Clara, CA (US)

(73) Assignee: Turboroto, Inc., Santa Clara, CA (US)

( * ) Notice: Subject to any disclaimer, the term of this patent is extended or adjusted under 35 U.S.C. 154(b) by 265 days.

(21) Appl. No.: 16/926,622

(22) Filed: Jul. 10, 2020

Related U.S. Application Data

(62) Division of application No. 16/112,707, filed on Aug. 25, 2018, now abandoned, which is a division of application No. 14/685,599, filed on Apr. 14, 2015, now abandoned.

(60) Provisional application No. 62/014,114, filed on Jun. 19, 2014.

(51) Int. Cl.
| | |
|---|---|
| *H02P 21/00* | (2016.01) |
| *H02K 3/28* | (2006.01) |
| *H02K 23/28* | (2006.01) |
| *H02K 3/12* | (2006.01) |
| *H02P 6/16* | (2016.01) |
| *H02P 6/12* | (2006.01) |

(52) U.S. Cl.
CPC ............. *H02K 3/28* (2013.01); *H02K 3/12* (2013.01); *H02K 23/28* (2013.01); *H02P 6/16* (2013.01); *H02P 6/12* (2013.01)

(58) Field of Classification Search
CPC . H02P 6/16; H02P 6/12; H02P 21/146; H02K 3/28; H02K 3/12; H02K 23/28
See application file for complete search history.

(56) References Cited

U.S. PATENT DOCUMENTS

| | | | |
|---|---|---|---|
| 4,274,043 A | 6/1981 | Heitz | |
| 4,638,224 A | 1/1987 | Gritter | |
| 4,833,355 A | 5/1989 | Kawashima | |
| (Continued) | | | |

FOREIGN PATENT DOCUMENTS

DE 102009027662 A1 * 1/2011 ............ H02P 21/146

OTHER PUBLICATIONS

PCT International Search Report and Written Opinion, dated Jan. 15, 2016.

*Primary Examiner* — Cortez M Cook
(74) *Attorney, Agent, or Firm* — Roark IP

(57) ABSTRACT

A direct current (DC) electric motor assembly with a closed type overlap stator winding which is commutated with a timed commutating sequence that is capable of generating a stator rotating magnetic field. The coil overlap of the winding and a timed commutation sequence are such that the current in each slot of the stator is additive and when a previous magnetic pole collapses according to a commutation sequence; the energy released by that previous collapsing magnetic field is captured to strengthen the next magnetic field on the commutation sequence schedule. Electrical currents produced by the collapsing magnetic fields flow to low electric potential and add or subtract to the DC current provided by the commutator thus promoting formation of the next magnetic on commutation schedule. When used with a suitable commutator and rotor, the electric motor assembly provides a true brushless high torque speed controlled Real Direct Current (RDC) motor that operates with higher efficiency and higher power density.

18 Claims, 35 Drawing Sheets

(56) References Cited

U.S. PATENT DOCUMENTS

| | | | |
|---|---|---|---|
| 4,882,524 | A | 11/1989 | Lee |
| 5,986,376 | A | 11/1999 | Werson |
| 6,985,799 | B2 | 1/2006 | Zalesski |
| 8,816,546 | B2 | 8/2014 | Bywaters et al. |
| 8,912,704 | B2 | 12/2014 | Petter et al. |
| 2005/0093512 | A1 | 5/2005 | Mader |
| 2009/0323208 | A1 | 12/2009 | Kurosawa |
| 2010/0213897 | A1 | 8/2010 | Tse |
| 2011/0068633 | A1 | 3/2011 | Quardt |
| 2012/0199172 | A1 | 8/2012 | Avrutsky |
| 2012/0299549 | A1 | 11/2012 | Kim |
| 2013/0147418 | A1* | 6/2013 | Palmer .................. H02K 21/145 310/156.01 |

* cited by examiner

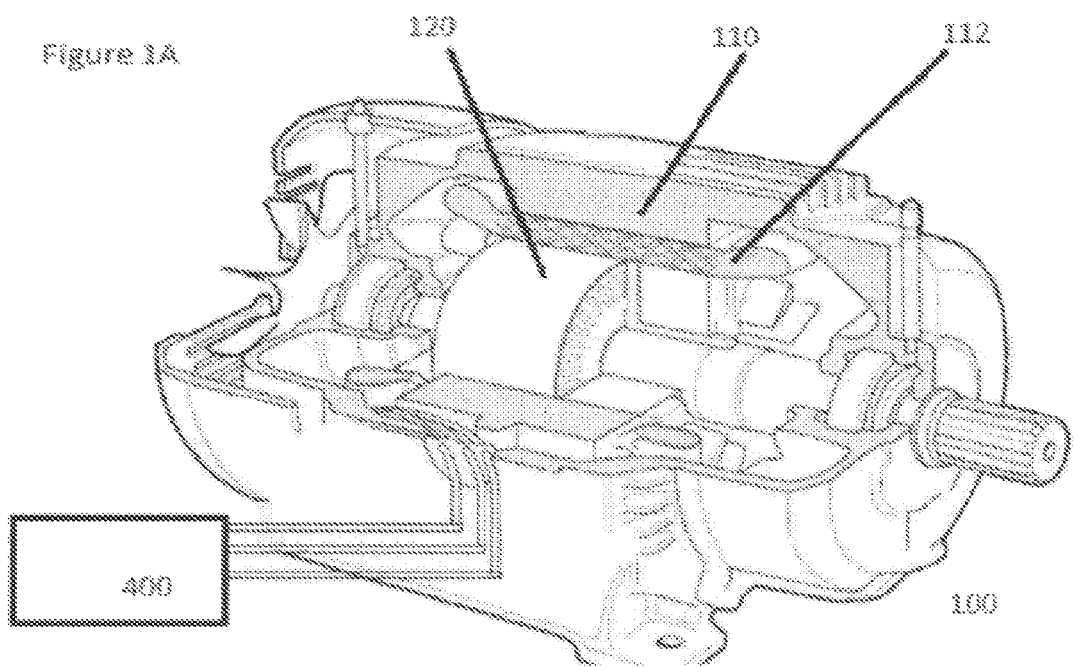

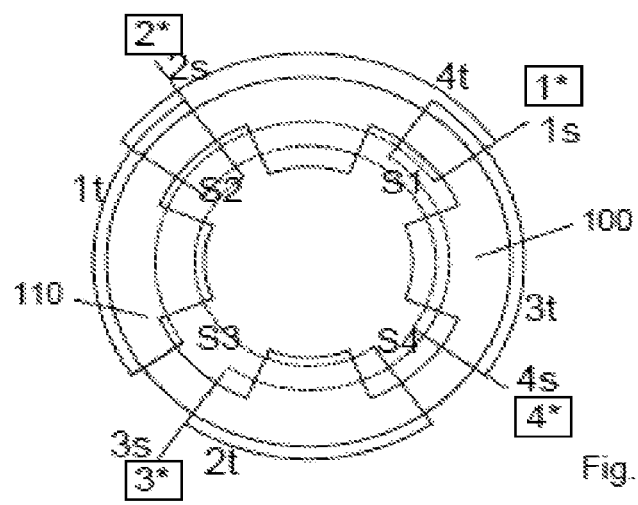
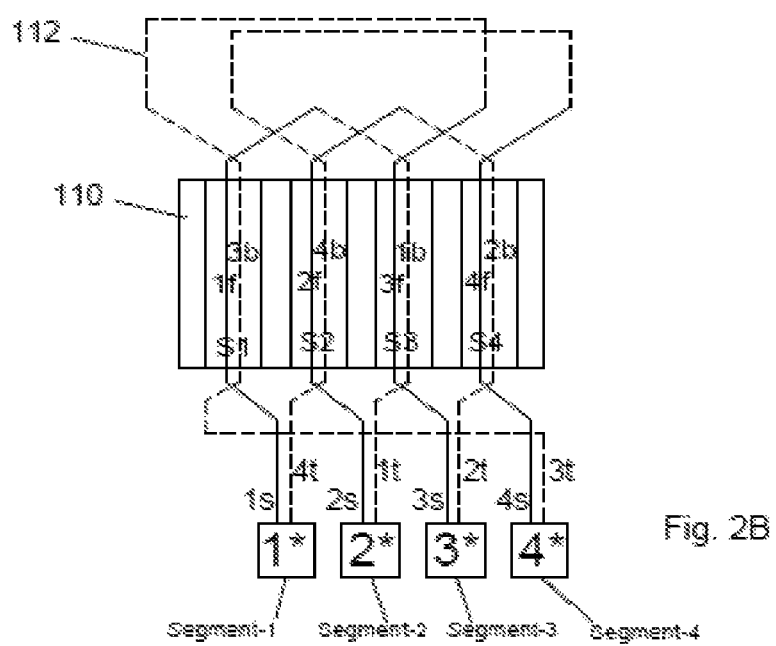

| Steps | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| Segment 1 | + | + | + |   |   |   |   |   |   |   |   |   |   | + | + | + |
| Segment 2 |   |   | + | + | + | + | + | + |   |   |   |   |   |   |   |   |
| Segment 3 | ▮ |   | ▮ | ▮ | ▮ | ▮ |   |   |   |   |   |   |   |   |   |   |
| Segment 4 |   | ▮ | ▮ |   |   |   | ▮ |   |   |   |   |   |   |   |   |   |
| Field Vector | 225° | 247.5° | 270° | 292.5° | 315° | 337.5° | 360° | 22.5° | 45° | 67.5° | 90° | 112.5° | 135° | 157.5° | 180° | 202.5° |

Fig. 4

| Steps | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| Segment 1 |  | + |  | + |  |  |  | ▮ |  | ▮ |  | ▮ |  |  |  | + |
| Segment 2 |  | + |  | + |  | + |  |  |  | ▮ |  | ▮ |  | ▮ |  |  |
| Segment 3 |  | ▮ |  |  |  | + |  | + |  | + |  |  |  | ▮ |  | ▮ |
| Segment 4 |  |  |  | ▮ |  | ▮ |  | ▮ |  |  |  | + |  | + |  | + |

Time →

Fig. 6

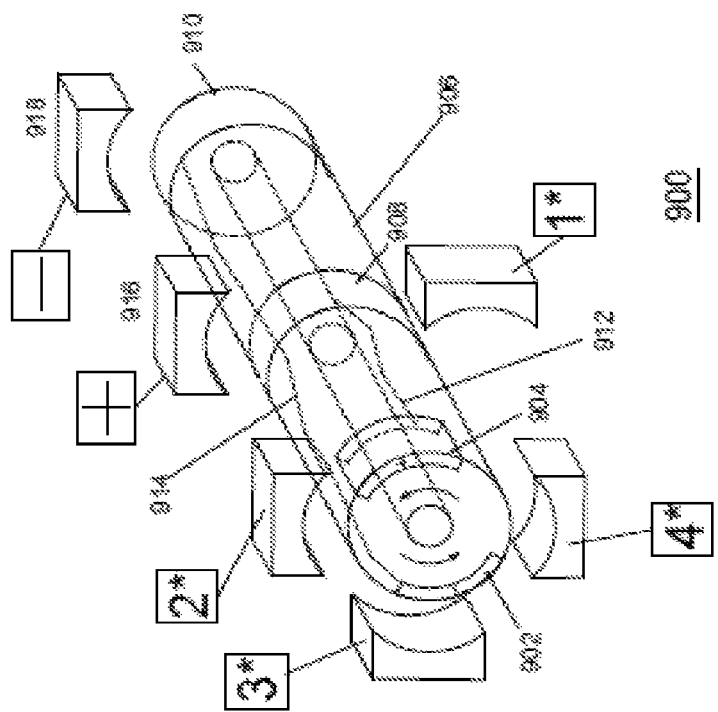
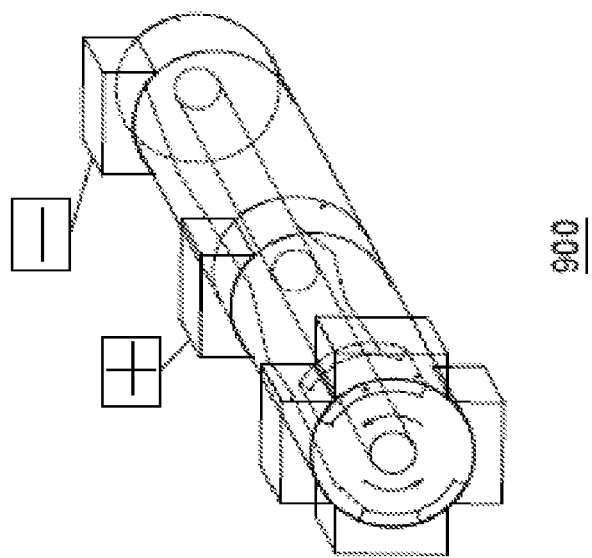
Fig. 9B
Fig. 9A

| Steps | #1 | #2 | #3 | #4 | #5 | #6 | #7 | #8 | #9 | #10 | #11 | #12 | #1 |
|---|---|---|---|---|---|---|---|---|---|---|---|---|---|
| Segment 1 | + | + | + |  | − | − | − | − | − |  | + | + | + |
| Segment 2 | − |  | + | + | + | + | + |  | − | − | − |  | − |
| Segment 3 | − | − | − | − | − |  | + | + | + | + | + | − | − |
| Field Vector | 270° | 300° | 330° | 0° | 30° | 60° | 90° | 120° | 150° | 180° | 210° | 240° | 270° |

Fig. 11C

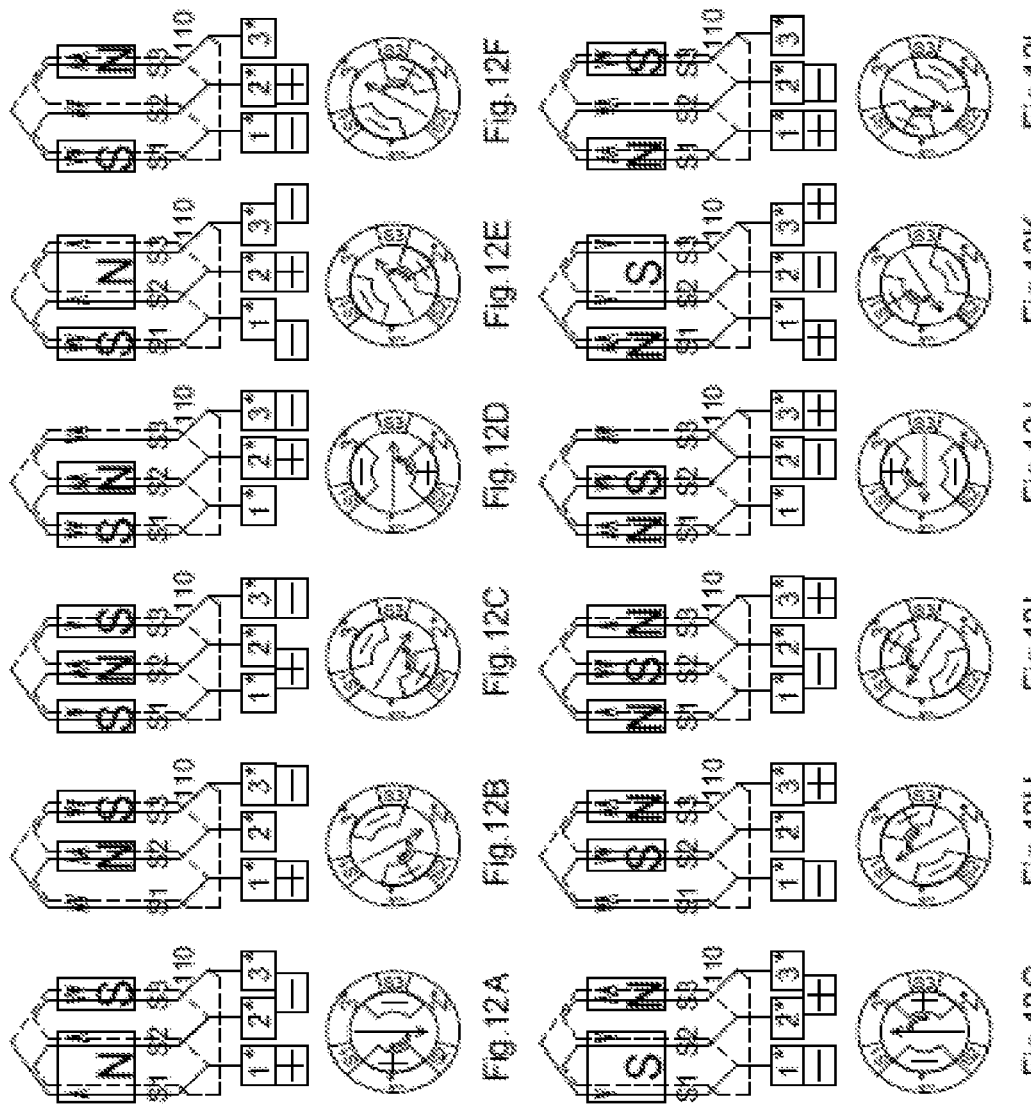

| Step # | #1 | #2 | #3 | #4 | #5 | #6 | #7 | #8 | #9 | #10 | #11 | #12 | #13 | #14 | #15 | #16 | #17 | #18 | #19 | #20 |
|---|---|---|---|---|---|---|---|---|---|---|---|---|---|---|---|---|---|---|---|---|
| Segment 1 | + | + | + |   |   |   |   |   | ∎ | ∎ | ∎ | ∎ | ∎ |   |   |   |   |   | + | + |
| Segment 2 |   |   | + | + | + | + | + |   |   |   |   |   | ∎ | ∎ | ∎ | ∎ | ∎ |   |   |   |
| Segment 3 | ∎ |   |   |   |   |   | + | + | + | + |   |   |   |   |   |   | ∎ | ∎ | ∎ | ∎ |
| Segment 4 | ∎ | ∎ | ∎ | ∎ | ∎ |   |   |   |   |   | + | + | + | + | + |   |   |   |   |   |
| Segment 5 |   |   |   |   | ∎ | ∎ | ∎ | ∎ | ∎ |   |   |   |   |   | + | + | + | + | + |   |

Fig. 16

ELECTRIC MOTOR, GENERATOR AND COMMUTATOR SYSTEM, DEVICE AND METHOD

CROSS REFERENCE TO RELATED APPLICATIONS

This application claims the priority benefit of U.S. patent application Ser. No. 16/112,707, filed on Aug. 25, 2018; which claims the priority benefit of Ser. No. 14/685,599, filed on Apr. 14, 2015; which claims the priority benefit of U.S. Provisional Patent Application No. 62/014,114, titled "True Brushless DC Motor, Generator and Commutator", filed on Jun. 19, 2014; the entire contents of these applications are incorporated herein by reference.

FIELD OF THE INVENTION

This invention is in the field of electric motors, generators and commutator systems.

BACKGROUND OF THE INVENTION

The direct current (DC) electric motor was invented in the early 1800's, and the alternating current (AC) electric motors were invented about 50 years later in the later 1800's. Since then both types of electric motors have become highly developed and are used to provide mechanical force for a wide variety of different applications.

Brief Review of Basic Electromagnetism and Electric Motor Design

Ampere's Law describes the generation of a magnetic field in the presence of an electric current. Magnetic fields produced via Ampere's Law are used to generate physical magnetic forces in devices such as electromagnets and electric motors. Faraday's Law of Induction, in addition to being important for electric motors, also serves as the conceptual foundation for most of the world's electrical generating and distribution systems. Faraday's Law of Induction describes the generation of an electric field from a magnetic field that changes in intensity over time. An electric field produced via Faraday's Law also gives rise to an electromotive force (EMF) which in turn produces an electric current. Electric fields produced via Faraday's Law are used to generate electrical currents in devices such as electric transformers and electric generators.

Motors are generally composed of a stationary part, called the stator, and a moving part, called the rotor. Additional components, such as commutators, are also often used (particularly with DC motors) to operate the motor by switching the direction of current between the rotor and an external power supply. Rotors typically comprise rotatable shafts and can be constructed in different ways. Different types of rotors known in the art include permanent magnetic rotors, as well as electromagnetic coil based rotors including squirrel cage rotors, synchronized rotors, and reluctance based devices including reluctance rotors, stepper rotors, and the like. Although stators with permanent magnets are known, generally stators are constructed with a stator body that incorporates multiple pairs of coils of wire (coils). These stator electric coils are often, but not always, arranged in a radial manner around the center of the body of the stator. Rotors often, but not always, fit inside openings that are often in the center of the stator body.

In an AC induction motor, such as a three-phase AC electric motor, the timely alternating sinusoidal current from the AC power supply naturally switches the direction of the current flowing through the various motor stator coils, usually many times per second. This creates an alternating magnetic field on the stator winding which, when combined with the phase angle differences between the different phases of the applied AC current, creates a rotating magnetic field on AC motor stator. In effect, the sinusoidal variations in the three-phase AC current provide a natural self-commutation process. The natural speed of the motor is in effect set by the frequency of the AC current.

For both AC and DC motors, many applications require that the speed of the motor be precisely controlled. Although for some applications, various types of gearing arrangements may be used to regulate speed; often it is important to regulate the underlying speed of the motor itself. This is not entirely always easy. In order to regulate the natural (e.g., neglecting gearing arrangements) speed of an AC motor, usually the frequency of the AC power supply must be changed. A common method of doing this is to utilize Variable Frequency Drive (VFD) methods. VFD devices create AC current at different frequencies by acting as inverters to transform a DC current from a DC power supply into AC current at the desired frequency. However instead of providing a smoothly varying sinusoidal AC current, as might be obtained from a real rotational AC generator, inverters, such as VFD typically uses Pause Width Modulation (PWM) methods to create pseudo sinusoidal waves. The jagged, step function type nature of the AC current provided by a VFD creates Total Harmonic Distortion (THD) effects, and this THD effects in turn create various types of inefficiencies and other problems in AC electric motors and other devices.

Thus, for example, when a typical VFC driver switches between producing 2 KiloHertz (kHz) to 15 kHz AC current, and is used to drive an AC motor, at the higher frequency, there are typically greater VFD power switching losses as well as a greater AC skin effects on the motor winding. This causes both waste energy and creates unwanted heat. These effects further act to limit the VFC and PWM's maximum switching frequency which turn limits how fast the AC motor can rotate. Nonetheless, VFD devices are highly useful because they allow AC motors to operate with precision speed control. As a result, AC motors are slowly starting to replace the use of traditional DC motors in a wide variety of applications.

For an AC motor, when sinusoidal AC current is used to power the coil, the induced EMF produced by collapsing AC is effectively and naturally suppressed. However AC motors are often not as strong as DC motors. This is because the AC current caused magnetic field is varying continuously, thus preventing the magnetic field in the AC motor's coils from ever staying at their peak for any appreciable amount of time. This limits the maximum starting torque that an AC motor can exert.

An additional problem with AC motors is that the varying magnetic field causes induction resistance which, relative to DC motors, further restricts current flow at the maximum supply voltage. This further limits the strength of the AC motor coil's magnetic fields, and thus further limits maximum torque, especially at high rotations per minute (RPM). Another problem with AC motors is that AC skin effect (AC tends to travel along the outside "skin" of a wire, rather than inside the wire) further resists current flow at a high frequency which again limits its performance. Other problems associated with AC controllers, such as total harmonic distortion (THD), which converts into heat in the stator core, waste energy and reduce the motor's power density for a given motor frame size.

BRIEF SUMMARY OF THE INVENTION

Aspects of this disclosure include a direct current (DC) electric motor system comprising: a stator having a closed type winding including at least three coils which produce a stator rotating magnetic field which is coupled with a rotor magnetically, the rotor capable of rotating when induced by the stator rotating magnetic field; a commutator coupled to the stator and which controls the stator rotating magnetic field through a timed commutation sequence; and wherein the stator and the at least three coils are configured so that energy released from a collapsing stator rotating magnetic field on a de-energizing commutation step in a first of the at least three coils is captured by a second of the at least threes coils energized on a next step of an energizing commutation step.

Further aspects of the disclosure include an alternating current (AC) induction electric motor system comprising: a stator having a closed type winding including at least three coils which produce a stator rotating magnetic field which is coupled with a rotor magnetically, the rotor capable of rotating when induced by the stator rotating magnetic field; a variable frequency drive coupled to the stator and which controls the stator rotating magnetic field; and wherein the stator and the at least three coils are configured so that energy released from a collapsing stator rotating magnetic field in a first of the at least three coils is captured by a second of the at least three coils.

Further aspects of the disclosure include a method for producing a stator rotating magnetic field in a direct current (DC) electric motor system comprising: producing the stator rotating magnetic field from a closed type winding of a stator including at least three coils coupled with a rotor magnetically, the rotor capable of rotating when induced by the stator rotating magnetic field; controlling the stator rotating magnetic field with a commutator through a timed commutation sequence; and wherein the stator and the at least three coils are configured so that energy released from a collapsing stator rotating magnetic field on a de-energizing commutation step in a first of the at least three coils is captured by a second of the at least threes coils energized on a next step of an energizing commutation step.

BRIEF DESCRIPTION OF THE DRAWINGS

FIG. 1A is a perspective view of a motor assembly 100 as described herein.

FIG. 2A shows details of four individual coils for the four slots electric motor stator 110 of FIG. 1C.

FIG. 2B shows a closed type stator winding diagram of the four slot electric motor stator 110 from FIG. 1A.

FIG. 4 shows one embodiment of sixteen steps timed commutation sequence for the four segment closed type stator winding, each commutation step advances 22.5 degree to generate one 360 degree rotation of the magnetic field.

FIG. 6 shows an alternative commutation switching option that is interchangeable with the commutation sequence of FIG. 4 and creates the same field effect.

FIG. 7I shows a segments potential graph of one full magnetic field revolution of an eight step timed commutation sequence.

FIG. 9A is an alternative embodiment of the commutator 400 in the form of a rotary mechanical commutator shown in operation and FIG. 9B shows an exploded view of the rotary mechanical commutator.

FIG. 11C shows a twelve step time commutation sequence for the three segments closed type stator winding, FIGS. 12A-12L shows the current and stator magnetic field geometric positions in reference to the stator slot for the twelve steps time commutation sequence for the three segments closed type stator winding of FIGS. 11A-11C.

FIGS. 13A-13F show a series of winding diagrams of the three slot stator each paired with a side view of the three slot stator (pairs FIGS. 13A and 13B; 13C and 13D; and 13E and 13F) to show a current flow direction and stator magnetic flux direction at different steps of the commutation sequence.

FIG. 16 shows an embodiment of a twenty step timed commutation sequence for a five segments closed type stator winding.

FIG. 24A shows one de-energize step and FIG. 24B shows one energize step.

DETAILED DESCRIPTION

Figure 1B:
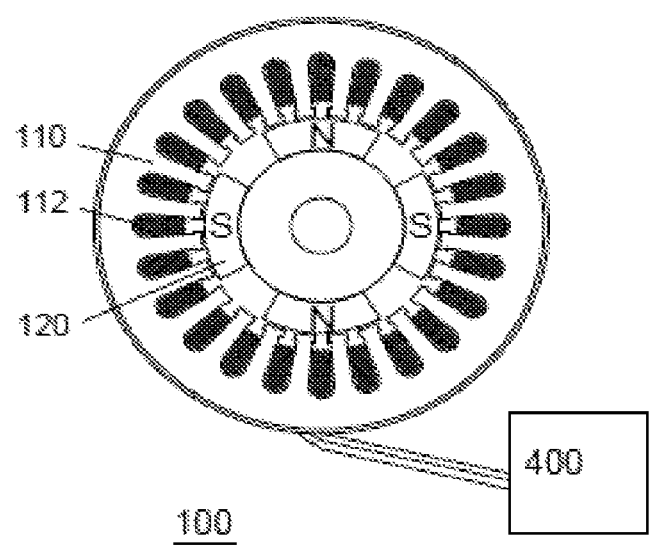
FIG. 1B is an axial view of the motor assembly 100 with commutator 400.

In contrast to AC motors, DC electrical motors don't have a "natural commutator". To operate a DC electrical motor, the DC current passing through the various coils of the DC motor must be varied using various types of commutator devices. In some DC electric motor designs, the stator may incorporate either permanent magnets or non-switched electromagnets (e.g., non switched stator coils), and instead the magnetic field of the rotor may be varied by a function of time, usually by switching the direction of current flowing through the windings of the various rotor coils.

In some alternative DC motor designs, a rotating magnetic field is generated on the DC electric stator instead. In these designs, the motor stator generally comprises various coils (each coil usually formed from multiple wire windings). The motor stator can be operated by sequentially switching or commutating the direction of the current flowing through the windings of the various motor stator coils in a manner that produces a rotating magnetic field. This rotating magnetic field in turn can be used to induce rotation in a rotor with suitable magnetization or reluctance.

In some types of DC motors, such as step motors and reluctance motors, the coil windings are electrically driven by individual electric half bridges (allow connected terminal connect to either positive or negative of DC power supply). When a particular coil winding is powered with electrical current, it creates a magnetic field, and in essence there is energy stored in this magnetic field.

More specifically, applying electric current through a conductor coil (e.g., a coil of conducting wire) creates a magnetic field. Energy is stored in this magnetic field, in a manner not unlike storing kinetic energy in a rotating flywheel. When this applied electrical current is removed, an EMF (electromagnetic force) is induced, and this stored magnetic field energy is discharged in the form of an electric current at a voltage (electrical potential). According to Lenz's law, an induced electromotive force (EMF) always gives rise to a current whose magnetic field opposes the original change in magnetic flux. Thus the discharged electrical current flows in the same direction as the original applied current.

The problem with such types of DC motors is that during the commutation process, once power is removed from a previously powered coil, that coil's magnetic field promptly collapses. The energy stored in the coils collapsing magnetic field (e.g., self-induced EMF) previously stored in the coil winding, is now released. Where does it go? For AC motors, the AC sinusoidal current acts to suppress this self-induced EMF naturally. However for DC motors, the energy in the coil winding's self-induced EMF comes back as self-induced EMF electrical current and this has to go somewhere. With present designs, the self-induced EMF electrical current generally travels back to the DC power supply or is consumed into ballast resistors. This is not a problem for small DC motors, but for high power motors, the magnitude of the self-induced EMF electrical current is quite high, and it can become very challenging to handle. This is a major reason why prior art step motors can only handle low amounts of power (e.g., up to few hundred watts); and even prior art DC reluctance motors can only handle a few kilowatts of power.

At the same time DC motors, in particular DC brushed motors, have some compelling advantages for some applications. For example, DC brushed motors can be designed with a stationary field coil and commutated armature coil winding scheme. Rush starting a DC current can create very large amounts of starting torque. As a result, such DC motor designs are often favored in various types of high starting torque applications, such as for traction motors on railways, city trolleys and subway third rail systems.

One problem with DC brushed motors, however, is due to the brushes themselves. The brushes create friction, contact resistance heat loss, plus armature winding resistance loss. These effects create large amount of heat trapped in the relatively small rotor part of the motor, it is difficult to remove this armature heat, as a result, brushed DC motors are typically built on an open frame design to allow excess heat to escape or force vented. As the brushes used to provide current to the armature usually wear quickly, the DC brushed motors of large size are often high maintenance devices, and their armatures/rotors have to be frequently removed and reworked for maintenance.

In the detailed description of the embodiments disclosed herein, there will be described an improved electric motor, which can be driven by multiphase AC current or commutated by DC current. Because AC is naturally commutating as its name stands for, it does not require a commutator and a sinusoidal AC naturally suppresses self-induced EMF. Electric motor DC commutation is explained in detail in this disclosure. In at least one embodiment, the improved electric motor will generally comprise at least one stator and commutation system for DC operation. However alternate embodiments are also contemplated accordingly (e.g., universal motors with multiple stators and even possibly multiple rotors). The embodiments disclosed herein will typically operate using electrical current (power, energy) from at least one DC power source (i.e., DC power supply, DC energy source, DC current source). More specifically, there is disclosed herein a direct current (DC) electric motor assembly with a closed type overlap stator winding which is commutated with a timed commutating sequence that is capable of generating a stator rotating magnetic field. The coil overlap of the winding and a timed commutation sequence is such that the current in each slot of the stator is additive and when part of a previous magnetic pole collapses according to a commutation sequence; the energy released by that part of a previous collapsing magnetic field is captured to strengthen the next magnetic field on the commutation sequence schedule. Electrical currents produced by the collapsing magnetic fields flow to low electric potential and add or subtract to the DC current provided by the commutator thus promoting formation of the next magnetic field on commutation schedule. When used with a suitable commutator and rotor, the electric motor assembly provides a true brushless high torque speed controlled DC motor that operates with higher efficiency and higher power density.

FIG. 1A is a perspective view of a Real Direct Current (RDC) motor assembly 100 as will be described in detail. Besides stator 110, the motor assembly features rotor 120 and coil windings 112 connected to commutator 400 (e.g., a switch commutator). The simple permanent magnet rotor 120, with a North and South Pole, can rotate inside the stator 110 in response to stator rotating magnetic fields created by the coil windings 112. Coil windings 112 are classified into two different types in this disclosure: i) closed type winding or ii) open type winding. In a closed type winding, a closed path is formed around the stator. The starting point of the winding is reached again after passing through part or all the turns. Commutator segments (described below) are connected to various winding coils 112 and as a result the current in the coil windings gets divided into different parallel paths. The current flowing through the coil windings changes continuously. In contrast, in open type windings such as star connected AC machines, a commutator is not used. In such cases the ends of each section of the winding can be brought at terminals to do the required type of interconnection externally. The open type of winding is often preferred over closed type as it gives better flexibility in design and freedom of connections. In this disclosure to allow the stator closed type winding to be clearer and more easily appreciated, rotors (e.g., 120) are not necessarily shown in the other figures of this description. However, all stators described herein should be assumed to be associated with an appropriate rotor(s) to form an electric motor assembly. Also, although only a four slot stator and closed type winding is shown in detail in FIGS. 1A-1D for use in motor assembly 100 it is to be understand that the number of slots in alternative embodiments of the stator can range from a minimum of three to one hundred and even greater than one hundred in number since there are actually no set, fixed upper limits on the number of slots in a stator. It should be noted that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9). Therefore, for example, when describing operation of a 4 slot stator, the description would apply equally to a 3, 8, 16, 72 or 100 plus slot stator (for example) and those different numbered slotted stators should be considered to be implemented according to the methods and systems described herein and are part of this disclosure.

When electric motors were originally developed in the 1800's, the available mechanisms to control the operation of electric motors were limited to relatively crude mechanical devices which had less than perfect timing and flexibility. Due to rapid advancing of modern solid state electronic technology, the performance of electric motors such as motor assembly 100 can be considerably improved. Because the coils in this closed type stator winding are interconnected, as described above the "closed type" means that from any point of the winding, it can be traced back to the same point along the coils. Because electric current flows naturally from high to low potential through least resistance, and the interconnected coils offer the least resistance path, it is regardless whether this current comes from external power or self-induced current from collapsing magnetic field on the coils. Therefore, closed type windings enable DC current switching on the coils without the penalty of self-induced high potential/voltage build up on the closed type stator winding. Also, when the closed winding is properly commutated, the self-induced current is facilitated to advance the stator rotating magnetic field and/or strengthen the next magnetic field on timed commutation sequence. The energy from collapsing field is therefore effectively captured inside the winding with the embodiments described herein.

FIG. 1B is an axial view of motor assembly 100 with commutator 400 located on the exterior of the assembly. Compared with traditional brushed DC motor, the maintenance problems of brushes inside the motor's body can be avoided by instead using an external type commutator system as shown in FIG. 1B. (However, in alternative embodiments, the commutator may be located inside the motor assembly 100). The commutator 400 is typically integrated electronics similar to AC motor VFD driver, made up of microprocessor, sensors, switches, input/output interface, and software to control the commutation of the motor assembly 100. The timed commutation sequence may be generated by coupling the rotor position mechanically or electronically with built in position sensors inside motor assembly 100 as a closed loop feedback such that when a first commutation step is commanded and the rotor 120 is induced to a detected position, a second commutation step is commanded so that the rotor 120 is induced to next position. On and on, so that the closed type stator winding DC motor is self-commutating. The position sensors can be any magnetic sensor, optical sensor, or solid state switch.

Figure 1C:
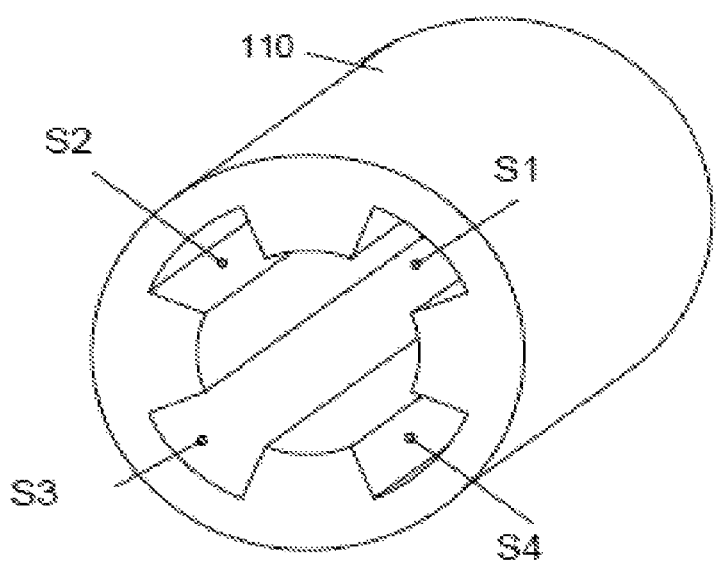
FIG. 1C shows the body of a four slot stator 110 in three-dimensional (3D) perspective, with parallel lengthwise ridges along the internal surface of the stator.

FIG. 1C shows a three-dimensional perspective view of the body of a four slot (or segment) stator 110 with parallel lengthwise ridges along the internal surface of the stator. The spaces between the ridges are the "slots" (e.g., S1-S4) and the coils are formed from conductor wires that are wound inside each slot around the ridges so that the coils pass through the slot. The cylinder (stator body 110) is generally made of magnetically permeable material and the ridges thus form the center of cores that concentrate and shape the magnetic fields created by current flowing through the coil windings 112.

Figure 1D:
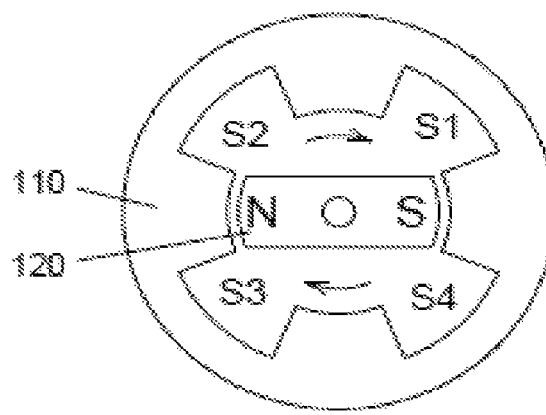
FIG. 1D shows the front face of the body of the four slot electric motor stator 100 from FIG. 1C above, along with a simple two pole permanent magnet rotor 120 operating inside of the stator 100.

FIG. 1D shows the front face of the body of the four slot electric motor stator 110 from FIG. 1C above, along with a simple two pole permanent magnet rotor 120 placed inside of the stator for illustration purposes. As previously stated, each of the motors disclosed herein should be assumed to have a rotor whether shown or not.

As will be discussed, the methods and systems described herein may be used to produce and operate a universal electric motor 100 comprising at least one rotor 120, one stator 110 and a commutator 400. The stator 110 will generally comprise a plurality of stator winding coils 112 that are held in a defined geometric position with respect to each other. These stator winding coils 112 are configured to be energized and deenergized with DC electrical energy by commutator 400 (e.g., a switch commutator). The stator coil and timed commutation sequence will generally be constructed to produce additive current in the stator slots (S1 to S4) to create a magnetic field. The magnetic field will produce a plurality of time varying and geometrically separated stator magnetic poles that in turn produce a DC created stator rotating magnetic field. The timed commutation sequence and the closed type winding schemes should be such that when self-induced EMF occurs from an electrically energized to deenergized coil or coils, it produces a current from the collapsing magnetic field. The self-induced EMF current should advance the stator magnetic field and help build the next magnetic field on the timed commutation schedule. The timed commutation sequence can be generated with a logic circuit(s) or micro processor(s) for open loop control, it can also be generated by detecting the rotor position with built in Hall-effect or magnetic sensors inside motor assembly 100 as a closed loop feedback such that when first commutation step is commanded and the rotor 120 is induced to a detected position, a second commutation step is commanded so that the rotor 120 is induced to next position. On and on, it can be phrased as self-commutation.

The system and method disclosed herein may produce improved DC electric motors that are efficient and potentially more durable than prior art DC electrical motors of this type. In addition to lower efficiency, prior art motors also tend to impose additional stress on various types of electronic circuitry. The embodiments disclosed herein can also help to achieve precision control over the speed of the DC motor.

The rotor 120 shown in FIG. 1D can be configured to produce rotor magnetic poles inside electric motor 100. This rotor 120 will generally be geometrically constrained proximate to the stator 110 (usually by various mechanical fixtures) in a manner that allows the rotor magnetic field to interact with a stator magnetic field produced by the closed type stator winding 112 and also allow the rotor to rotate about a rotor axis of rotation. As will be discussed herein, a stator created rotating magnetic field induces rotation in the rotor 120. The rotor 120 may be of various types including a squirrel cage induction rotor, wounded rotor, permanent magnet rotor, or reluctance rotor. In at least one embodiment, the rotor 120 and its corresponding magnetic poles may be shaped to match the configuration of the stator ridges, as well as to maximize the torque produced as the result of the stator's rotating magnetic field produced by the closed type stator winding 112. Note that in many constructions although the rotor may often be placed inside the stator, however, this need not always be the case. In alternative embodiments, the motor 100 may be designed with substantial portions of the rotor or even the entire rotor, held outside of the stator. The rotor and stator can also be configured in a horizontal flux motor design in which the rotor and stator are held in a face to face configuration.

Although the stator 110 is a brushless stator as described so far, in alternative embodiments the commutator used to provide power to the stator closed type winding need not be brushless. So long as the closed type stator winding can receive DC electrical energy, according to a timed commutation sequence, from a DC electrical power source by using a commutator system that commutator system may include mechanical switches, rotary switches, mechanical relays, solid state switches, logical devices, H-bridges, and/or computer processors (e.g., microprocessors, microcontrollers, other logical devices, and the like).

Various types of coil winding 112 schemes can be used as well. These schemes include brushed DC motor armature winding methods such as any of a group consisting of: lap winding, wave winding, and Gramme-ring winding methods.

FIG. 2A illustrates details of four individual coils 112 for the four slots S1-S4 electric motor stator 110 of FIG. 1C. FIG. 2B shows a closed type stator winding diagram of the four slot electric motor stator 110 from FIG. 1A. FIG. 2B is diagrammed according to the convention in which the stator body 110 is shown in flat format as if the stator 110 is cut lengthwise in between one of its slot of the stator cylinder then unrolled to a flat state. Commutation segments are shown with segments marked as X* squares (e.g., 1*, 2*, 3*, and 4*).

Figure 3A:
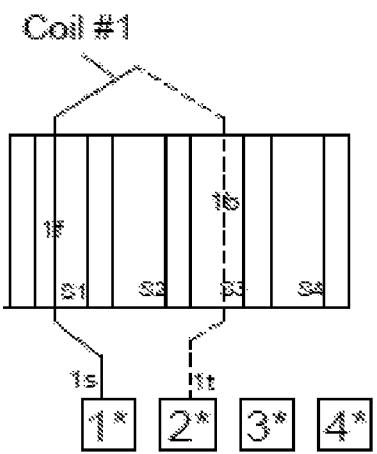
FIGS. 3A-3D show individual coil details for the four slot electric motor stator 110 previously illustrated in FIG. 2B.
Figure 3B:
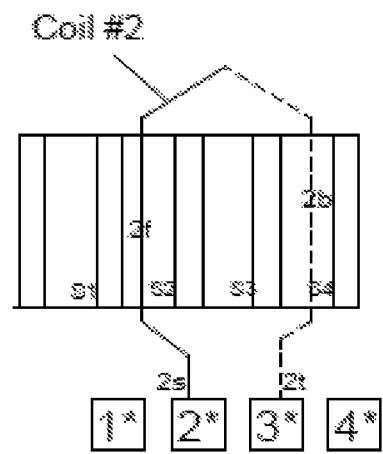
Figure 3C:
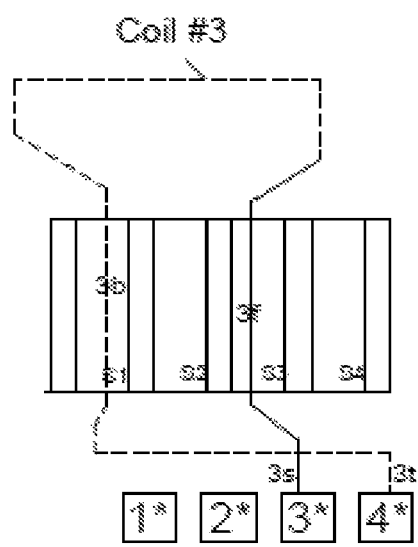
Figure 3D:
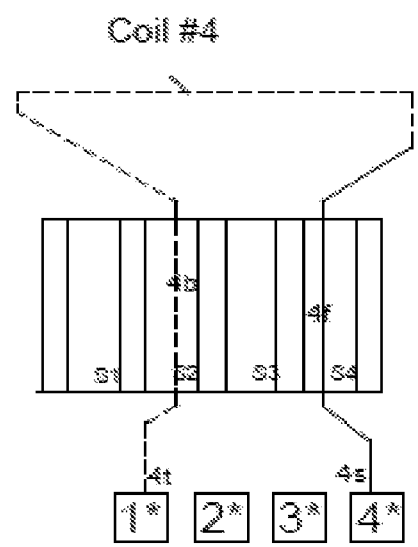

FIGS. 3A-3D show individual coil winding details (Coil #1, Coil #2, Coil #3, and Coil #4) for the four slots electric motor stator 110 previously illustrated in FIGS. 1A-2B. It should be noted how the coil bypasses slots. In FIG. 3A, the starting end of the Coil #1 (designated as 1*s* at commutation segment 1*) goes into stator Slot 1 (S1), marked as 1*f*, bypasses Slot 2 (S2), and is returned on stator Slot 3 (S3) (designated as 1*b*). The tail end of Coil #1 (designated as 1*t*) is then connected to the start end of next successive Coil #2 and connected to commutation segment or phase 2*. (This convention will be used throughout this disclosure). In FIG. 3B, the starting end of Coil #2 (designated as 2*s*) goes into stator Slot 2, marked as 2*f*, bypasses Slot 3, and is returned on stator Slot 4 (marked as 2*b*). The tail end of Coil #2 (designated as 2*t*) is then connected to the start end of next successive coil #3 and connected to commutation segment or phase 3*. In FIG. 3C, the starting end of the Coil #3 (designated as 3*s*) goes into stator Slot 3, marked as 3*f*, bypasses Slot 4, and is returned on stator Slot 1 (designated as 3*b*). The tail end of Coil #3 (designated as 3*t*) is then connected to the start end of next successive Coil #4 and connected to commutation segment or phase 4*. In FIG. 3D, the starting end of the Coil #4 (designated as 4*s*) goes into stator Slot 4 (marked as 4*f*) bypasses Slot 1 and is returned on stator Slot 2 (designated as 4*b*). The tail end of the Coil #4 (designated as 4*t*) is then connected to the start end of next successive Coil #1 and connected to commutation segment or phase 1*. Here each (front side) coil occupies one slot and this convention will be used throughout the various figures of this disclosure. Generally "commutation segment", "segment" and "phase" alternative terminologies will also be used herein.

Figure 3E:
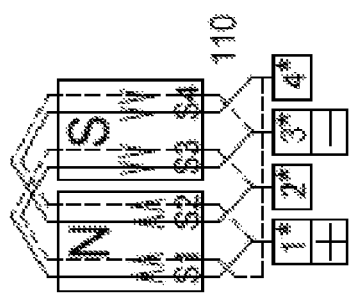
FIGS. 3E-3J show a series of winding diagrams of stator 110 each paired with a side view of the stator 110 (pairs FIGS. 3E and 3F; 3G and 3H; and 3I and 3J) to show a current flow direction and stator magnetic flux direction at different steps of the commutation sequence.
Figure 3F:
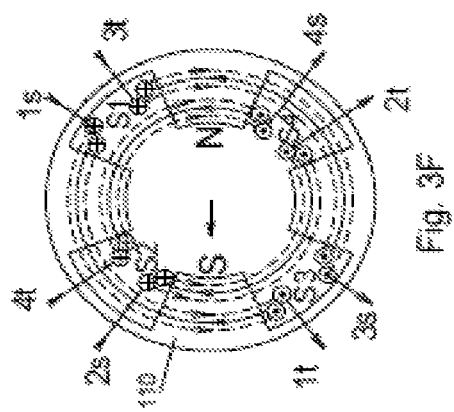
Figure 3G:
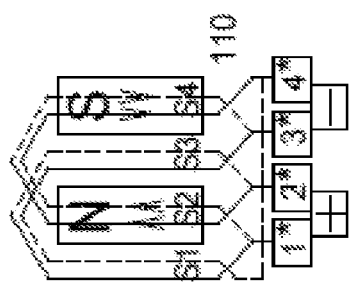
Figure 3H:
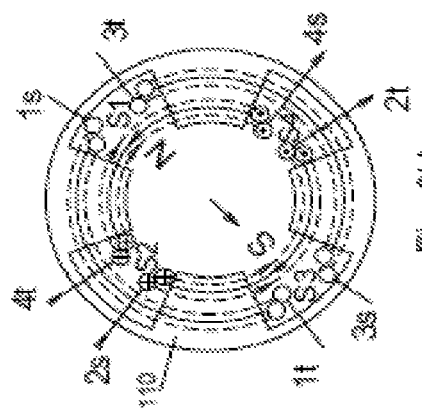
Figure 3I:
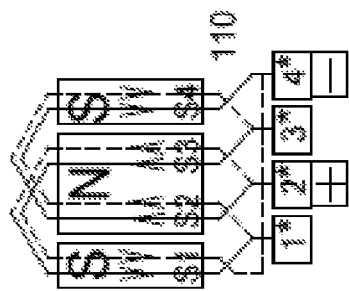
Figure 3J:
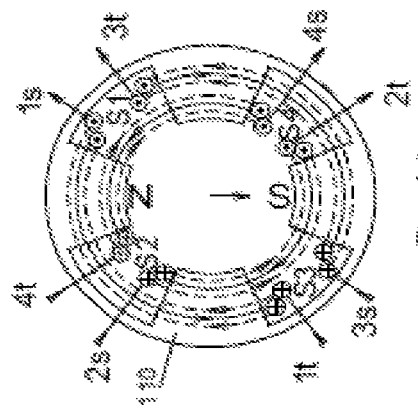

FIGS. 3E-3J show a series of winding diagrams of stator 110 each paired with a side view of the stator 110 (pairs FIGS. 3E and 3F; 3G and 3H; and 3I and 3J) to show a current flow direction and stator magnetic flux direction at different steps of the commutation sequence. In FIGS. 3E, 3H and 3J, the coils are shown in two turns for easy of illustrating the end winding (outside of slot coil winding) current direction. A coil in the back is shown in dashed line and in the front in solid line. A plus sign in a circle shows current going into the slot and a dot in the circle shows current flow out of slot. FIGS. 3E and 3F show Coil #1 being energized together with Coil #2, Coil #3 and Coil #4 and in the moment Coil #1 trail end is commutated to high potential segment *2. Between FIGS. 3E and 3G, the Coil #1 energized magnetic field starts collapsing; current generated from the collapsing field continues to flow to low potential segment 3* through coil #2 which strengthens the Coil #2 generated magnetic field. The result of the energy from the collapsing field is redirected to build or strengthen a coming magnetic field in the commutation schedule and energy is captured inside the closed type stator winding. Also at the same moment, the Coil #3 trail end is commutated to low potential segment 4*. From FIGS. 3E to 3G, the Coil #3 energized magnetic field starts collapsing; current generated from the collapsing field continues to flow to low potential segment 4* through Coil #4 which strengthens the Coil #4 generated magnetic field. Again the result of the energy from the collapsing field is redirected to build or strengthen a coming magnetic field in the commutation schedule and energy is captured inside the closed type stator winding. The stator magnetic field is effectively advanced approximately 45 degrees on this de-energize commutation step. From FIG. 3G to 3I, when the Coil #1 start end is released from high potential segment 1*, Coil #1 is getting charged with electric energy as current which effectively advances the stator magnetic field. At substantially the same moment when the Coil #3 start end is released from low potential segment 3*, Coil #3 is getting charged with electric energy as current which effectively advances the stator magnetic field. The stator magnetic field is advanced approximately 45 degrees on this energize commutation step. In the traditional AC motor lap or concentric winding, the current in the end coil portion of the coil (i.e., the outside of the slot portion) does not contribute to generate the stator magnetic field. All the coils in this closed type winding include coil portions outside of slots substantially equally contributing to energize the stator magnetic field, in other words the end coil portion and the in slot coil portion are all integrally part of the coil winding.

Figure 5:
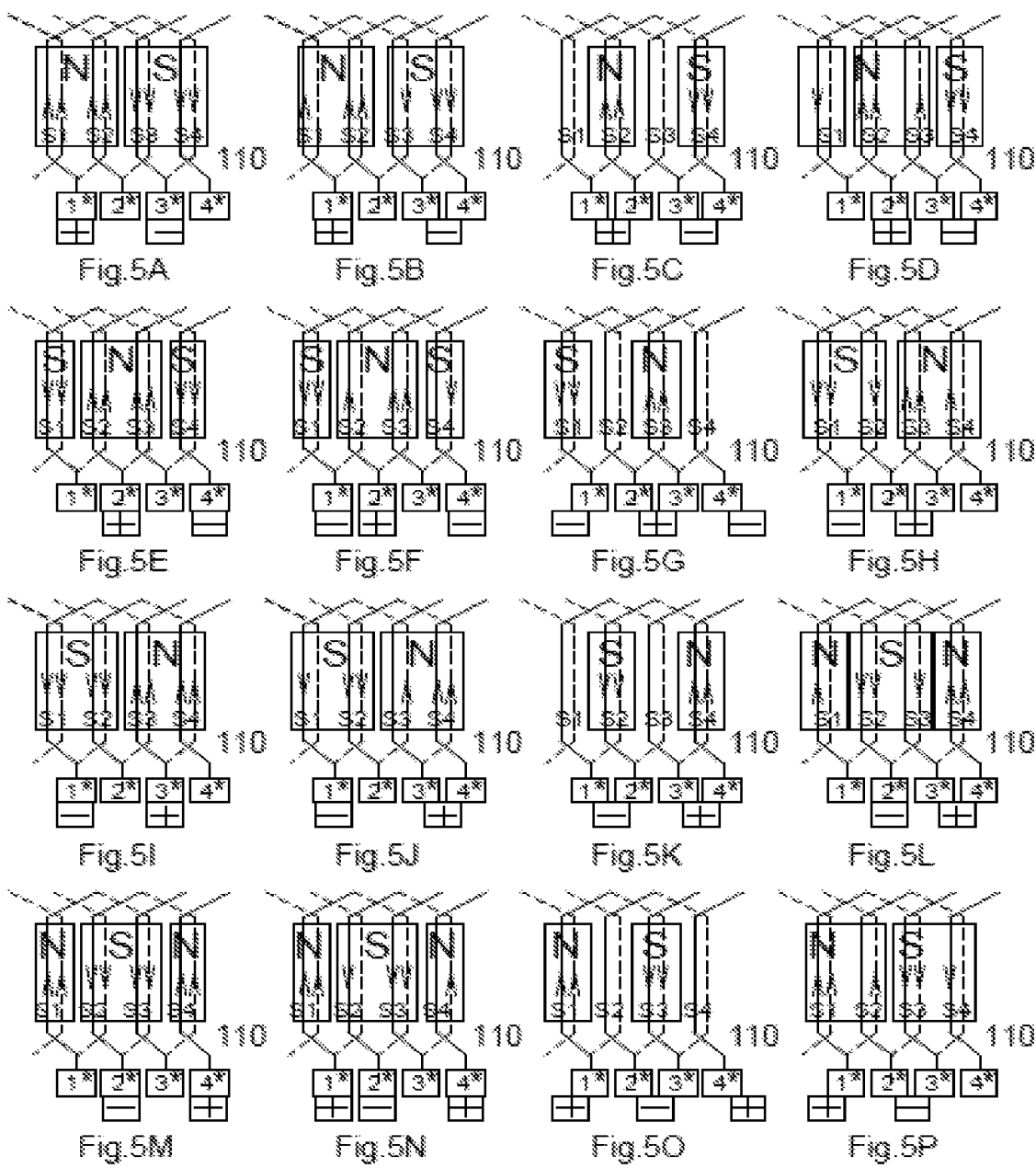
FIGS. 5A-5P illustrates a four segment closed type winding in a series of diagrams showing the sixteen step timed commutation sequence of FIG. 4 for one full magnetic field rotation.

FIG. 4 shows an alternative sixteen step timed commutation sequence for the four segment closed type stator winding 112 described in FIGS. 1A-3J, each commutation step advances approximately 22.5 degrees to generate one 360 degree rotation of a magnetic field. FIGS. 5A-5P show the four segment closed type windings 112 commutated with a sixteen step timed commutation sequence for one full magnetic field rotation. Current and direction in the windings 112 of FIGS. 5A-5P are shown by up and down arrows. Note that with each step of commutation, the magnetic field is advanced from the previous 22.5 degree step to create a counterclockwise rotating magnetic field. The reversed timed commutation sequence reverses the stator magnetic field direction of advancing, consequently reversing the rotor rotation. FIGS. 5A-5P best interpret this. Moving from FIG. 5A to FIG. 5B to FIG. 5C, it should be noted how current regenerated from the discharging magnetic field of FIG. 5B from a just deenergized Coil #1 is redirected to the next charging magnetic field of step #3 (FIG. 5C) because the electric current flows from high electric potential to low electric potential. At the instance of FIG. 5C, segment 2* is connected to positive DC power source; Coil #1 at both ends is placed at substantially the same high potential; the magnetic field generated by Coil #1 is starting to collapse; Coil #1 current created by the collapsing magnetic field will continue to flow into low potential on the closed type winding, which is segment 3*; and Coil #2 is offering the route for said current until the field is completely collapsed. The net effect of the discharging current from Coil #1 generated from the collapsing magnetic field have effectively advanced magnetic field approximately 22.5 degrees in this timed commutation sequence step and the discharging current is advancing and helping build next on the coming magnetic field on the timed commutation schedule. There is no high voltage generated on this closed coil winding induced by collapsing magnetic field. FIGS. 5A-5P are also interpret the charging and discharging step. There is a charging step when at least one more coil is energized on the closed type winding to advance the stator magnetic field and a discharging step when at least one more coil's both end is commutated to the same electric potential and the coil or coils would discharge the magnetic field energy stored from previous charging step. The discharging of the field induces current to continue to flow in a previous current direction until the discharging magnetic field is completely collapsed. The induced current together with current from the DC power supply results in advancing the rotating magnetic field one commutation step. The timed commutation sequence continuously commutating the closed type winding and advance the magnetic field forward, the advance magnetic field forward creates a DC generated stator rotating magnetic field and the rotating magnetic field rotates on the pace and direction of the timed commutation sequence. The timed commutation sequence on the closed type winding enables DC commutation without the penalty of inducing high electric potential on the closed type winding and this closed type winding can handle large DC electric current (e.g., over hundreds of amperes).

Figures 7A, 7B, 7C, 7D:
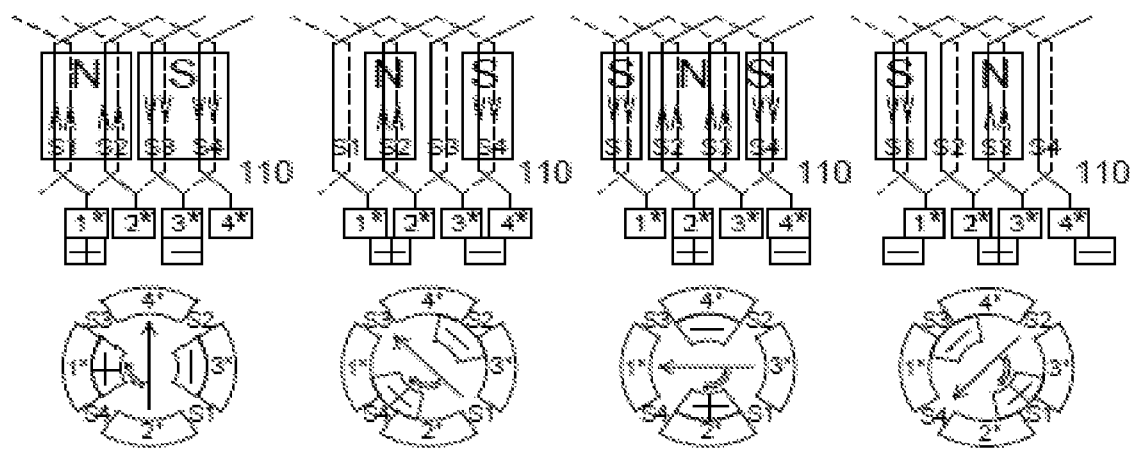
FIGS. 7A-7H shows the four segment closed type winding commutated with the eight step timed commutation sequence for one full magnetic field rotation.
Figures 7E, 7F, 7G, 7H:
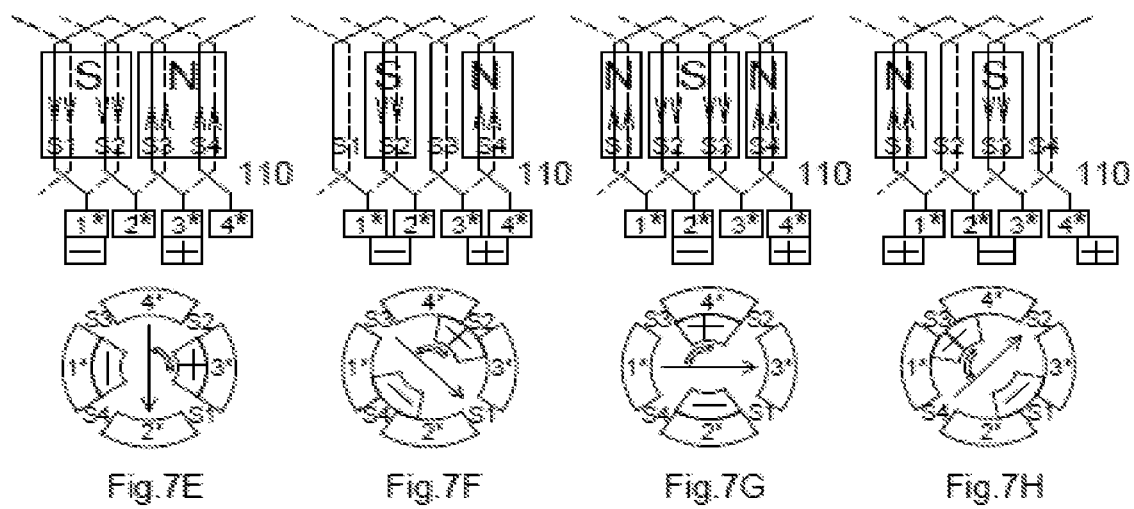
Figure 71:
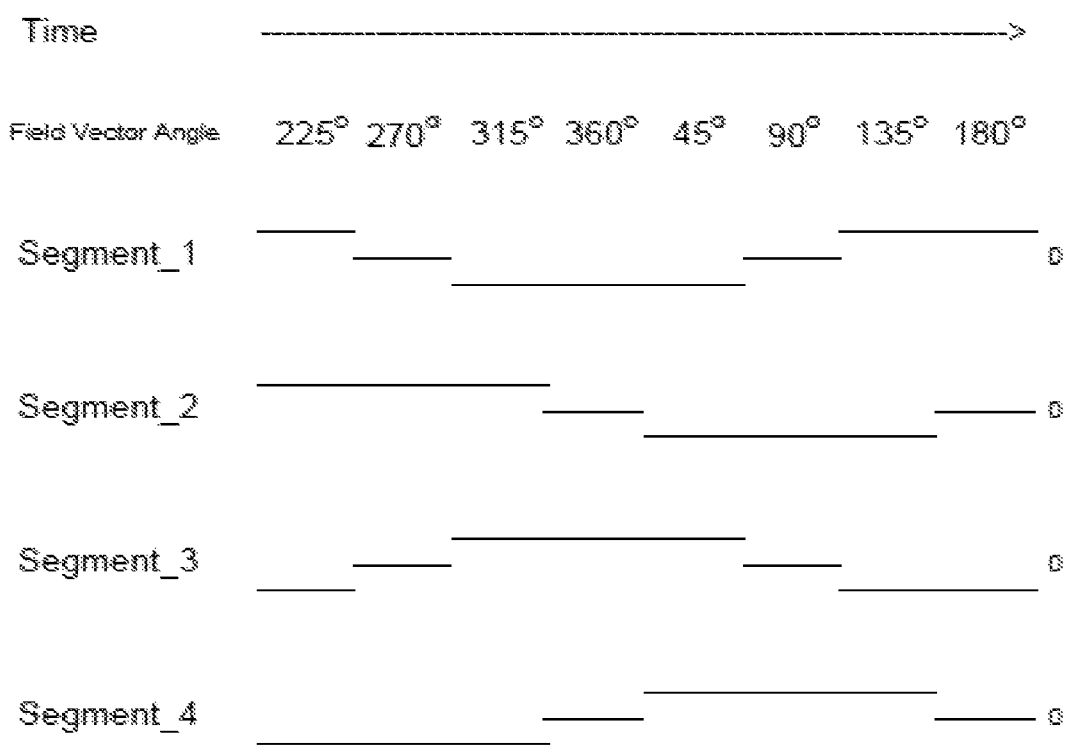

FIG. 6 is an example of one of the alternative commutation switching options that are interchangeable and may be used to create the same field effect of FIG. 4 in the motor assembly 100 illustrated in FIGS. 1A-3D. The eight commutation steps shown in FIG. 5B, FIG. 5D, FIG. 5F, FIG. 5H, FIG. 5J, FIG. 5L, FIG. 5N, and FIG. 5P can also be combined to create an eight step timed commutation sequence with each commutation step advancing substantially 45 degrees of the magnetic field as shown in FIGS. 7A-7H. FIG. 7I shows a segments potential graph of one full magnetic field revolution of an eight step timed commutation sequence. The basic operation principle behind the four slot closed type stator winding 112 and corresponding timed commutation sequence shown above can apply to any segment count of closed type winding and corresponding timed commutation sequence described herein. The closed type stator winding 112 and timed commutation sequence should be configured so that self-induced current from a collapsing magnetic field contributes to advance the stator rotating magnetic field and facilitate current in the slot additive to create the magnetic pole. Current cancelation in the same slot should be avoided unless to advance the stator magnetic field. For the closed type winding to consist of more than four segments, there are many more options with how many more slots a coil can pass over and how the commutator can be placed on the segments. The general method and system described herein still applies and additionally, balanced magnetic pole placement and paced commutation is preferred whenever possible.

The total slot count of the closed type stator winding can be described with the stator winding formula: $S = P \times N \times R$ where S is total slot count on the stator; P is at least three Segments/Phases; N is at least one slot each coil occupies; and R is at least one for stator pole pair count on the stator (e.g., R=2 for a four pole winding). Basically unlimited motor stator poles and slots combinations can be configured with this formula (or methodology) and are included in this disclosure herein. Similar like a Brushless DC (BLDC) motor, R time's winding magnetic field revolution makes one rotor revolution.

Figure 8:
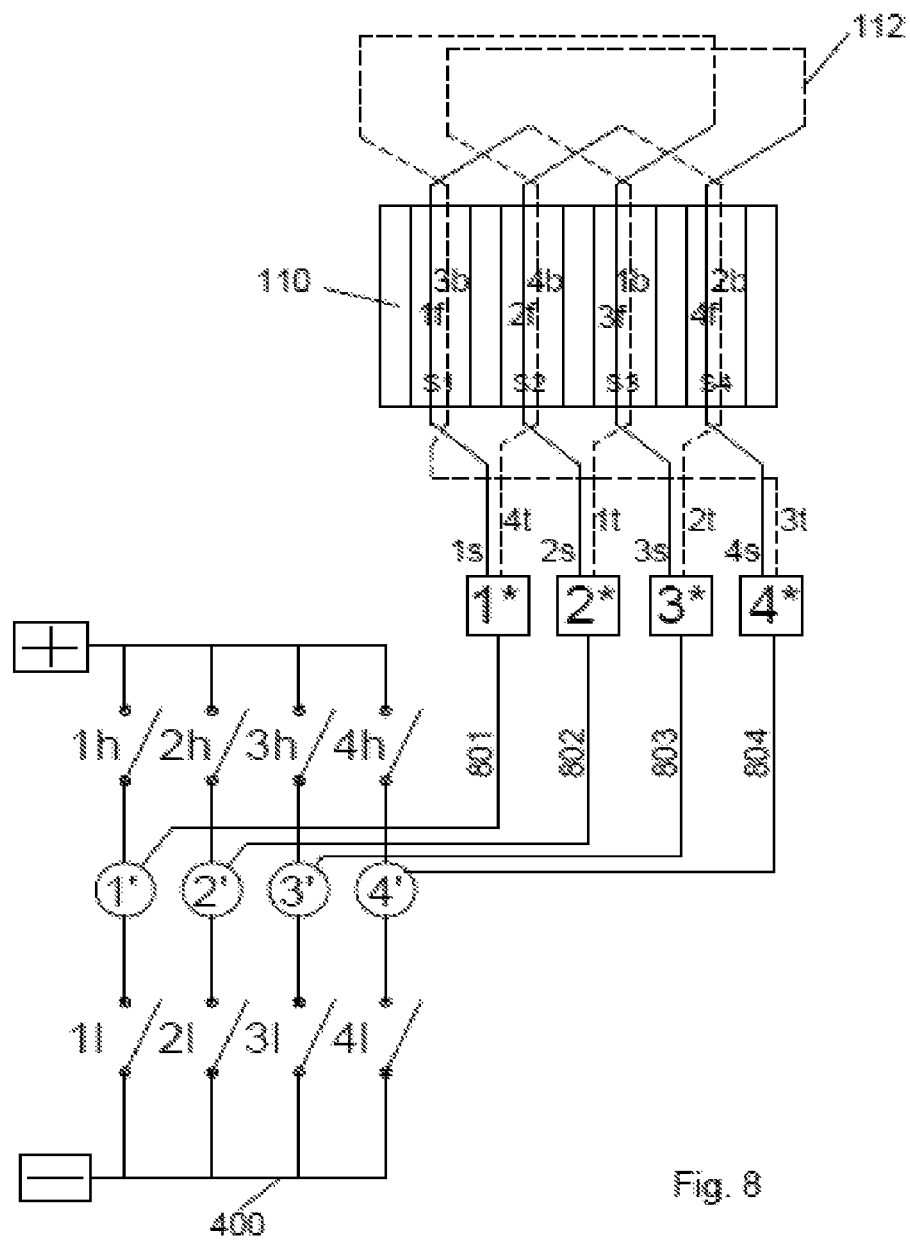
FIG. 8 shows stator 110 coupled with an embodiment of commutator 400 (e.g., a switch commutator) with an electric half bridge switch presentation.

FIG. 8 shows an embodiment of commutator 400 (e.g., switch commutator) which may be used in connection with FIGS. 1A-7I discussed above in an electric half bridge switch presentation. The electric half bridge is connected (through wire 801) to the closed type stator winding 112 through commutation segment 1* to facilitate the timed commutation sequence. Note the other commutation segments are also connected to the corresponding half bridge via other wires (802, 803, and 804). In order to keep the drawings simple, generally these half bridges and connecting wires between the electric half bridge and the commutation segment are not shown. Thus each of the commutation segments (with segments marked as X* squares) are connected to their corresponding half bridge (X' circles), which in turn connect to a DC positive power supply (not shown) through a high switch and is also connected to the DC ground through a lower switch.

Figure 9C:
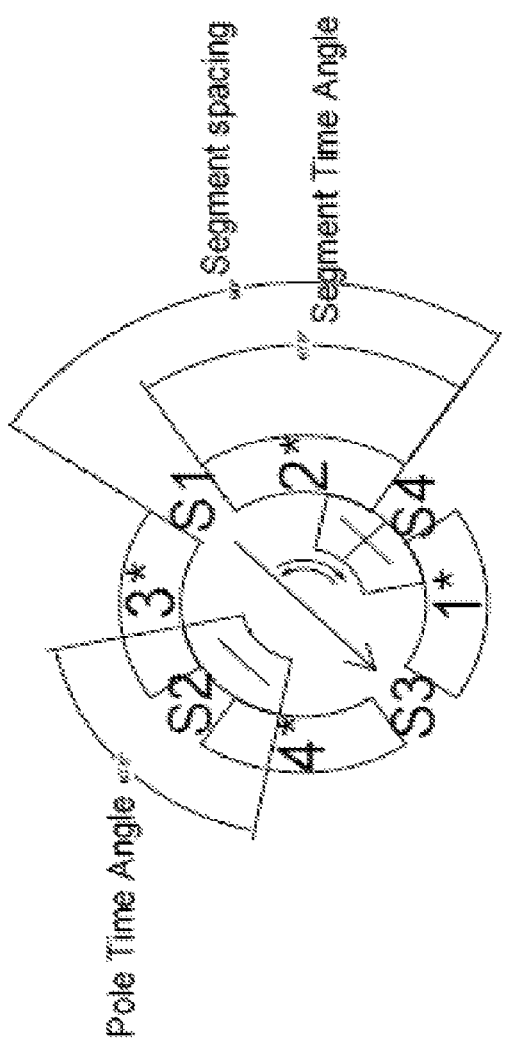
FIG. 9C shows an electromechanical diagram of the rotary mechanical commutator of FIGS. 9A and 9B.

FIG. 9A is an alternative embodiment of a commutator 900 which may be used with the embodiments of FIGS. 1A-7I. FIG. 9A illustrates a rotary mechanical commutator 900 in operation and FIG. 9B is an exploded view. The stationary spring loaded commutation segment brushes 1*, 2*, 3*, and 4* shown in FIG. 9B are sequentially mounted around the rotating electric poles 902 and 904. The rotary electric pole assembly 906 can be mechanically coupled to the motor rotor 120 for self-commutation or be driven by a second commutation motor governed by a timed commutation sequence. DC power is delivered to the rotating electric pole assembly 906 through slip rings 908 and 910 which are electrically interconnected with the electric poles 902 and 904 through wires 912 and 914, and the slip rings 908 and 910 are electrically in contact with spring loaded pole brushes 916 and 918 which are in turn electrically connected with stationary power supply. FIG. 9C shows an electromechanical side view diagram of FIGS. 9A and 9B highlighting the stator magnetic field vector. The commutation segments are sequentially and equally spaced around the rotary electric poles. The electric pole and the segment angular space (time angle) is three fourths of the angular space (time angle) of the segment pitch such that each of the eight commutation steps will have the same time interval or a paced commutation. However the segment and electric pole time angle can vary which will create a limitless un-paced commutation sequence. In FIG. 9C, slot numbers S1-S4 are in between the segments. A paced commutation is used in the sense that each timed commutation sequence step has a substantially equal interval, or accelerated pace, or decelerated pace as its name stand for.

Figure 10D:
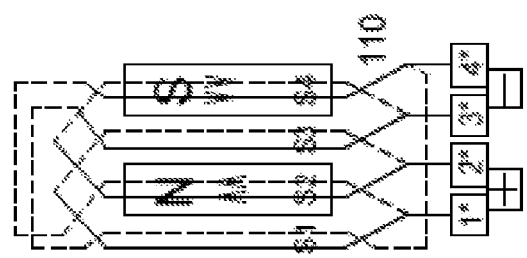
FIG. 10D is the corresponding settings of the commutator 400 switches.
Figure 10C:
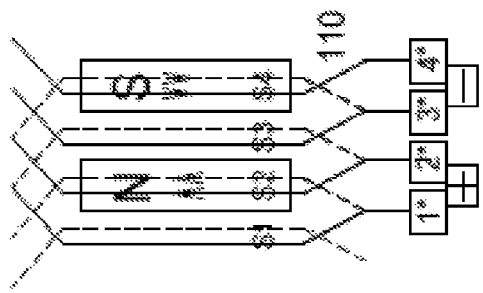
FIG. 10C shows a front view of the stator 110 illustrating the stator magnetic pole vector (magnetic field pointing direction) in their geometric positions in reference to the slot at this timed commutation sequence step.
Figure 10B:
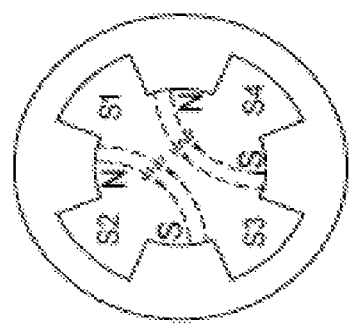
FIG. 10B shows a winding diagram of alternative embodiment of FIG. 10A to illustrate the coil routing.
Figure 10A:
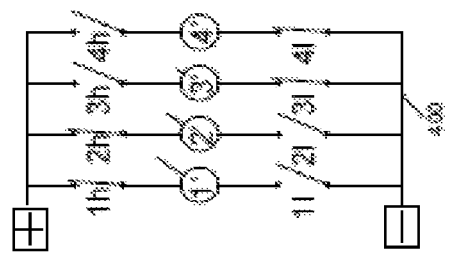
FIG. 10A shows a winding diagram of stator 110 with conventional electric currents flow and magnetic poles produced during a commutation step on the timed commutation sequence.

FIG. 10A shows electric current flows and magnetic poles produced during a commutation step on the timed commutation sequence. The Magnetic North Pole is drawn on an upward current slot and Magnetic South Pole is drawn on a downward current slot. The timed commutation sequence is present as: a plus symbol in a box attached to segments 1* and 2* represents commutator switch 1h and 2h is closed and connected to DC power positive; a negative symbol in a box attached to segments 3* and 4* represents commutator switch 3l; and 4l is closed and connected to DC power negative. (This convention is used throughout this disclosure). FIG. 10A also uses a number to represent stator slot number (i.e., Slot 1 is simplified as S1; Slot 2 is simplified as S2; Slot 3 simplified as S3; and Slot 4 simplified as S4). FIG. 10B shows an alternative way of interconnected coil routing to that of FIG. 10A with an independent coil winding for each pair of poles. FIG. 10C shows a front view of the stator 110 illustrating the stator magnetic pole vector (magnetic field pointing direction), in their geometric positions reference to the slot at this timed commutation sequence step. FIG. 10D is the corresponding settings of the commutator 400 switches.

Figure 11A:
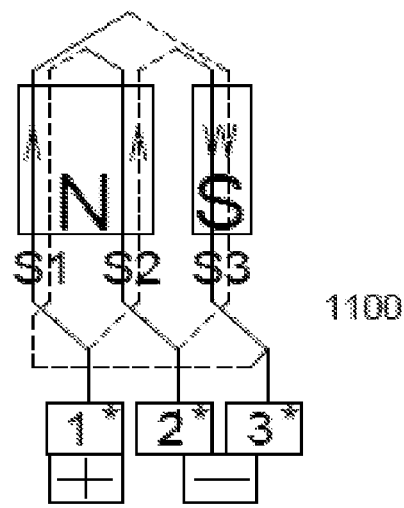
FIG. 11A shows an example of a three segment closed type stator winding.
Figure 11B:
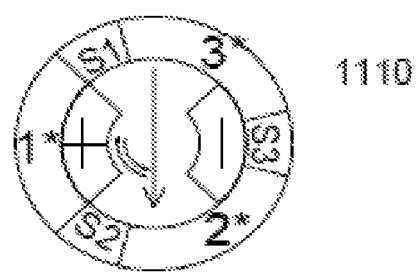
FIG. 11B shows an electromechanical diagram of one embodiment of a rotary commutator for a twelve step timed commutation sequence.

FIG. 11A illustrates an alternative embodiment of a three segment closed type stator winding 1100. FIG. 11B shows an electromechanical diagram of one embodiment of a rotary commutator 1110. FIG. 11C shows a twelve step time commutation sequence for the three segments closed type stator winding 1100. FIGS. 12A-12L show the current and stator magnetic field geometric positions with reference to the stator slot for the twelve steps time commutation sequence for the three segments closed type stator winding 1100. Each commutation step advances approximately 30 degrees of magnetic field. Note all the even steps have current cancelation in one slot which is undesirable. This even stepped interval should ideally be kept as short as possible in the twelve step timed commutation sequence or simply removed and instead electric half bridge dead time control to facilitate the charging step should be used. The dead time control is at no time both the high and low switch of the half bridges which would turn on the same time to avoid current shoot through (or "short the power supply"). The "dead time control" is performed by software or hardware. The physical time it takes to perform dead time control provides enough time for the coils get charged to advance the magnetic pole.

Figure 13E:
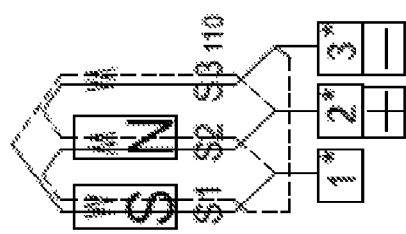
FIGS. 13A-13F shows a front view of a three slot stator with current flow direction and stator magnetic flux direction.
Figure 13F:
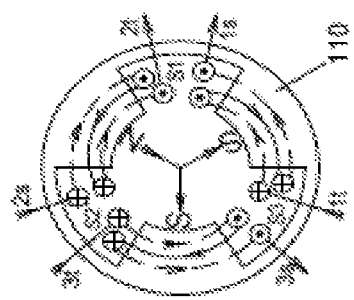
Figure 13C:
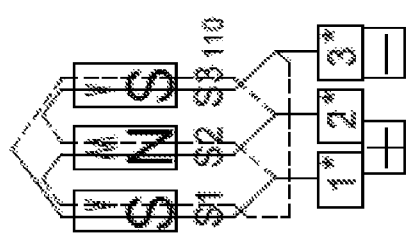
Figure 13D:
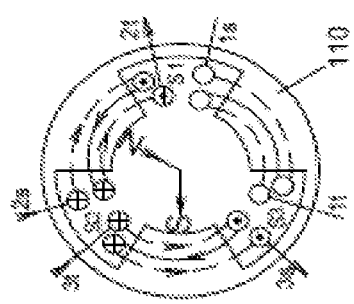
Figure 13A:
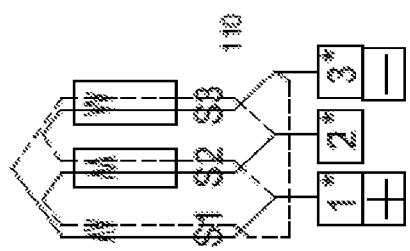
Figure 13B:
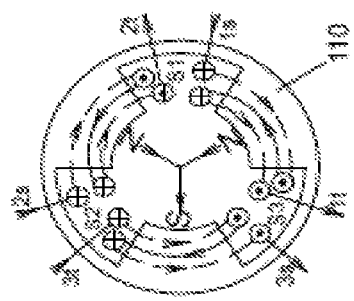

FIGS. 13A-F show a front view of three slot stator 110 with current flow direction and stator magnetic flux direction. In corresponding FIGS. 13A and 13B, the coils are drawn in two turns for easy of showing the end winding (outside of slot coil winding) current direction. A coil in the back is drawn in dashed line and drawn in solid line in the front. A plus sign in a circle shows current going into the slot and a dot in the circle shows current flow out of slot. FIG. 13A shows Coil #1 getting charged together with Coil #2 and Coil #3. At this moment Coil #1 trail end is commutated to high potential segment *2. In FIGS. 13C and 13D, the Coil #1 charged magnetic field starts collapsing; current generated from the collapsing field continues to flow to low potential segment 3* through Coil #2 which strengthens the Coil #2 generated magnetic field; the result of the energy from the collapsing field is redirected to build or strengthen an coming magnetic field in commutation schedule and energy is captured inside the closed type stator winding. The stator magnetic field is effectively advanced approximately 30 degrees on this commutation step. In FIGS. 13E and 13F, when the Coil #1 start end is released from high potential segment 1*, Coil #1 is getting charged with electric energy as current which effectively advance the stator magnetic field. Notice that the current in the end coil (outside of the slot) substantially equally contributes to energize the stator magnetic field and is an integral part of the coil winding to generate the stator magnetic field. As a result, this closed type stator winding results in more stator power density. This characteristic of current flow is especially beneficial for a very short slot motor stator.

Figure 14:
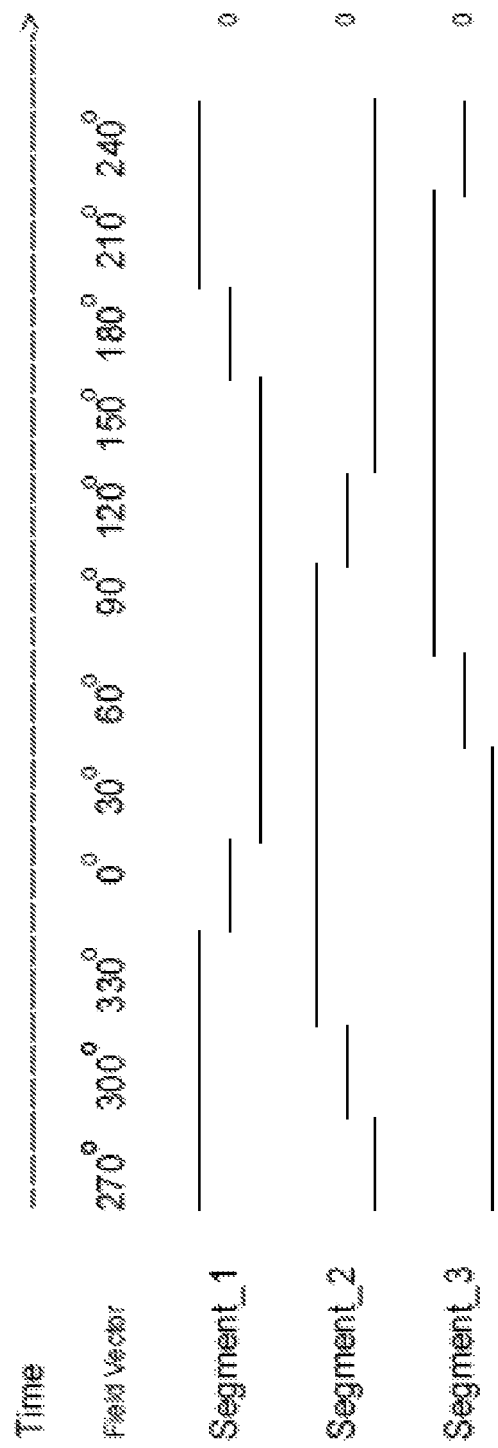
FIG. 14 shows segments potential graph of one full magnetic field revolution of a twelve steps timed commutation sequence for the three slot stator.

FIG. 14 shows a segments potential graph of one full magnetic field revolution of a twelve step timed commutation sequence for the three slot stator 1100.

Figures 15A, 15B:
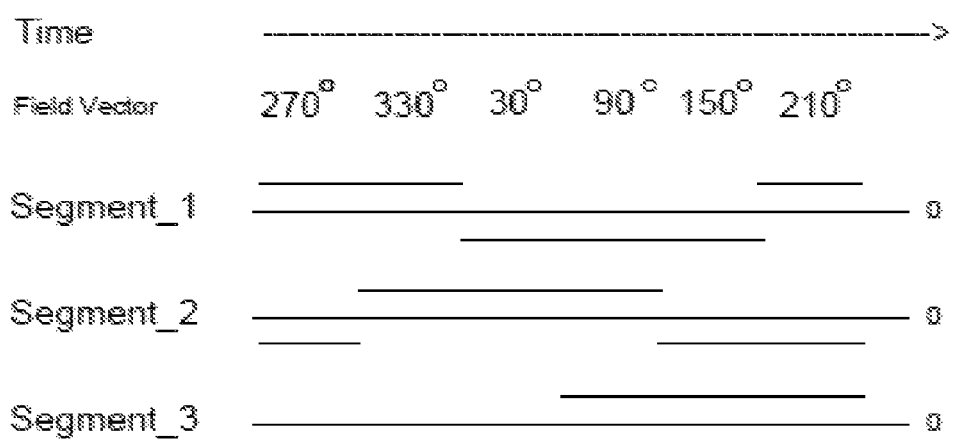
FIG. 15A shows a six step timed commutation sequence for the three slot stator.
FIG. 15B shows segments potential graph of one full magnetic field revolution of a six step timed commutation sequence for the three slot stator.

FIG. 15A shows an alternative six step timed commutation sequence for the three slot stator 1100 version of DC motor assembly 100. FIG. 15B shows segments potential graph of one full magnetic field revolution of the six step timed commutation sequence. For such six step pseudo paced timed commutation sequence, the stator magnetic field is advanced approximately sixty degrees from the previous step with each step of commutation. Again there are unlimited combinations of timed commutation sequences with varying step intervals, however, only one twelve step paced timed commutation sequence and one pseudo-paced six steps timed commutation sequence.

FIG. 16 shows an embodiment of a twenty step timed commutation sequence for a five segments closed type stator winding version of DC motor assembly 100. Again all the even steps have current cancelation in one slot which is vary undesirable and this even stepped interval should kept as short as possible in the twenty step timed commutation sequence.

Figure 17:
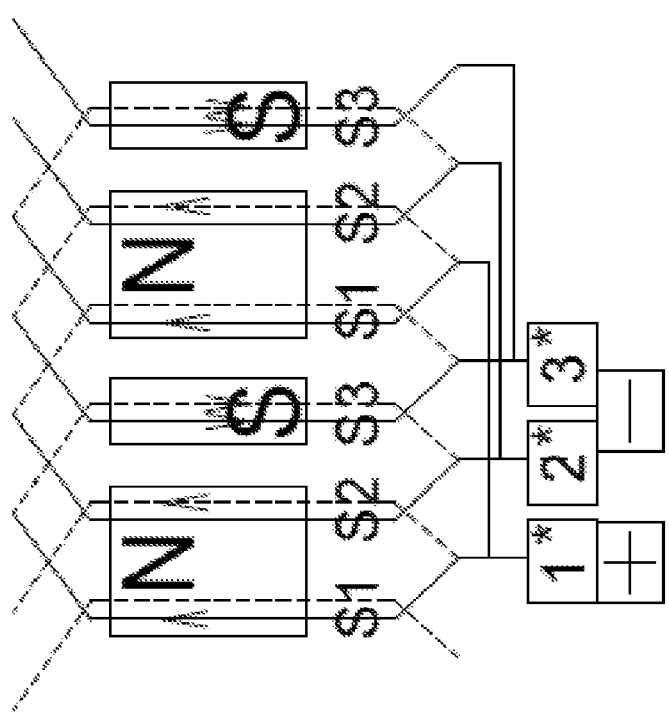
FIG. 17 shows a wiring diagram for a three segments four pole closed type stator winding where P=3, N=1, R=2, and S=6.

FIG. 17 shows a three segments four pole closed type stator winding where P=3, N=1, R=2, and S=6. Each coil occupies two slots one pair poles apart.

Figure 18:
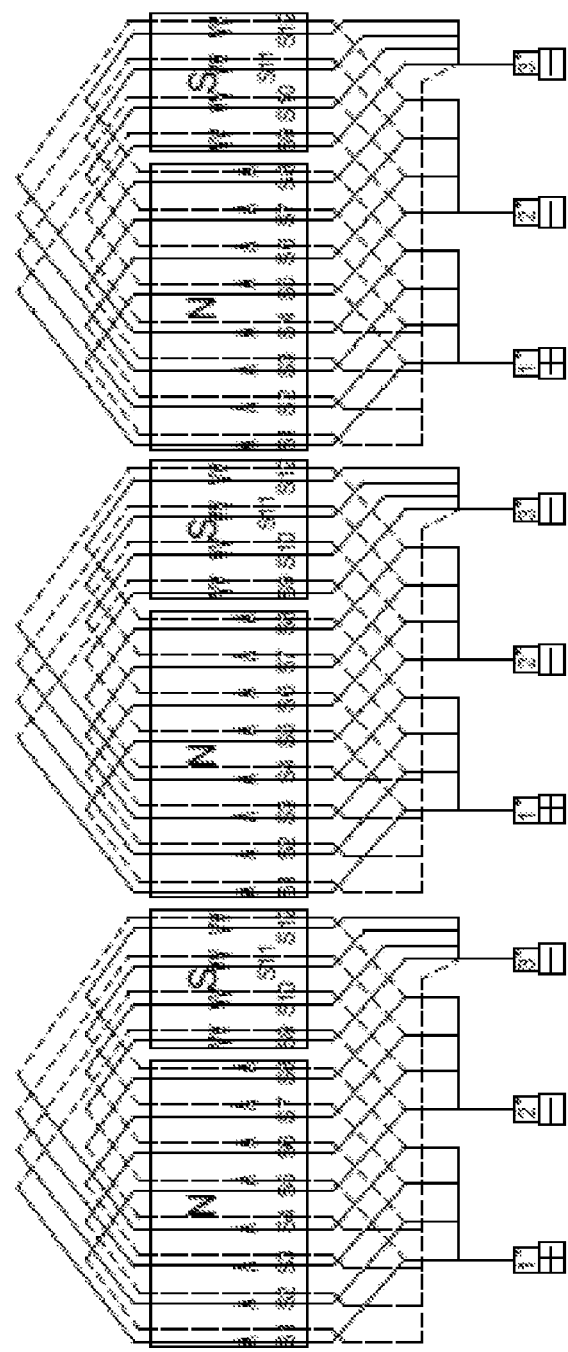
FIG. 18 shows a three segments six pole closed type stator winding where P=3, N=4, R=3, and S=36.

FIG. 18 shows three segments six pole closed type stator winding where P=3, N=4, R=3, and S=36. Each coil occupies four adjacent slots; the winding is spilt into three same groups.

Figure 19:
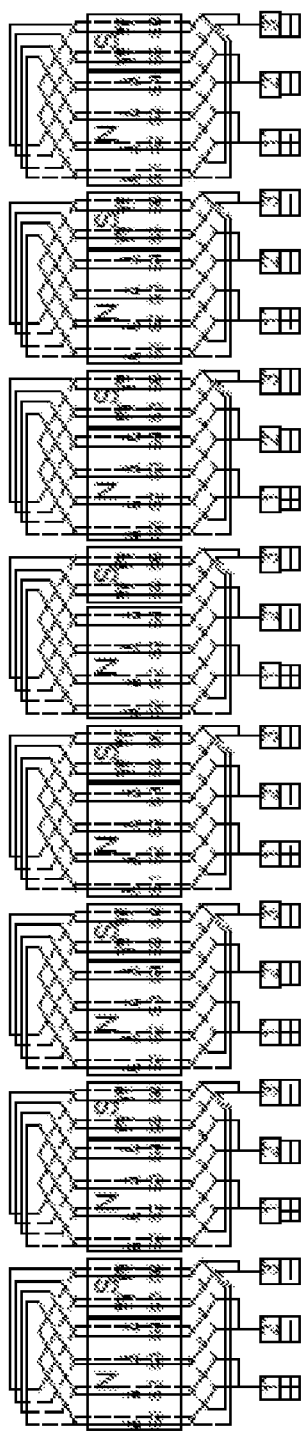
FIG. 19 shows a three segments sixteen pole closed type stator winding where P=3, N=2, R=8, and S=48.

FIG. 19 shows three segments sixteen pole closed type stator winding where P=3, N=2, R=8, and S=48. Each coil occupies two adjacent slots; the winding is spilt into eight same groups.

Figure 20:
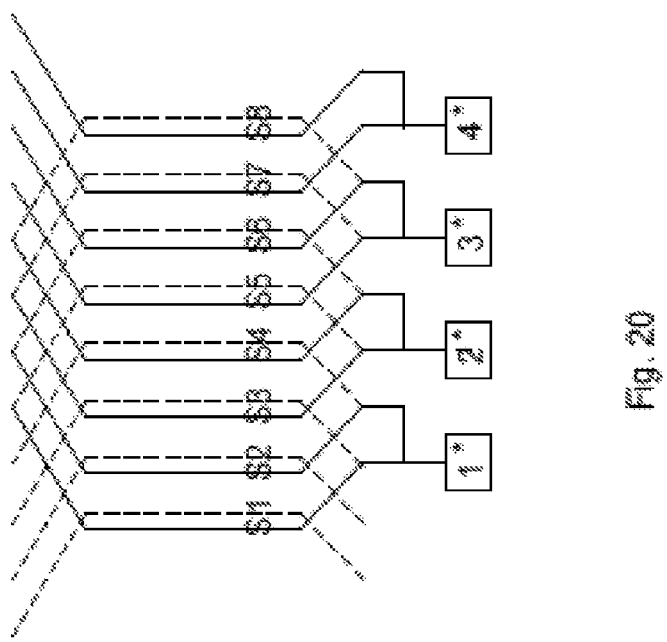
FIG. 20 shows a four segments two pole closed type stator winding where P=4, N=2, R=1, and S=8.

FIG. 20 shows four segments two pole closed type stator winding where P=4, N=2, R=1, and S=8. Each coil occupies two adjacent slots.

Figure 21:
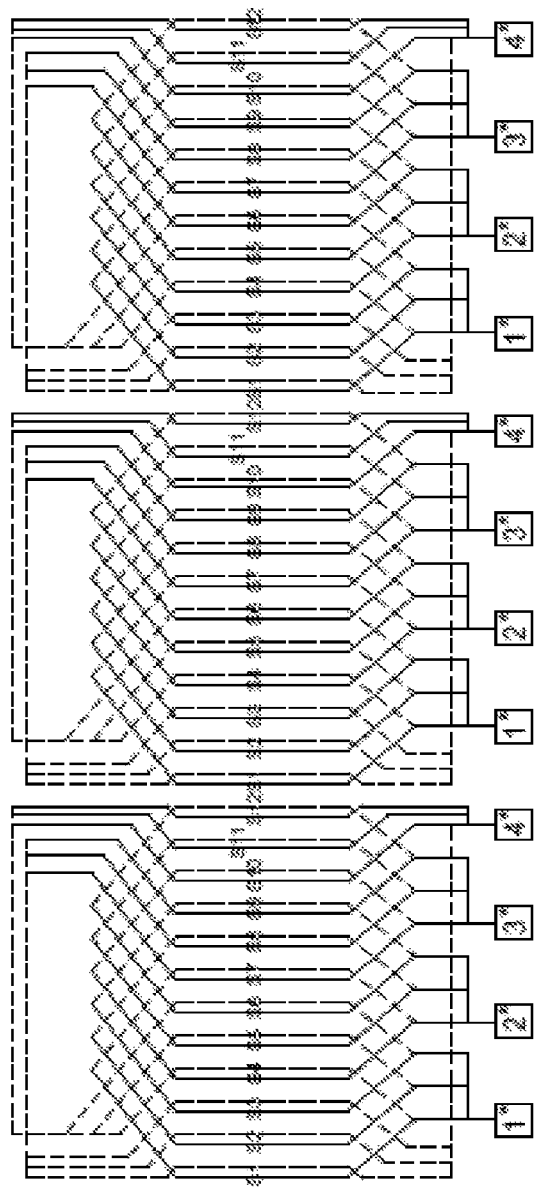
FIG. 21 shows a four segments six pole closed type stator winding where P=4, N=3, R=3, and S=36.

FIG. 21 shows four segments six pole closed type stator winding where P=4, N=3, R=3, and S=36. Each coil occupies three adjacent slots; the winding is spilt into three equal groups.

Figure 22:
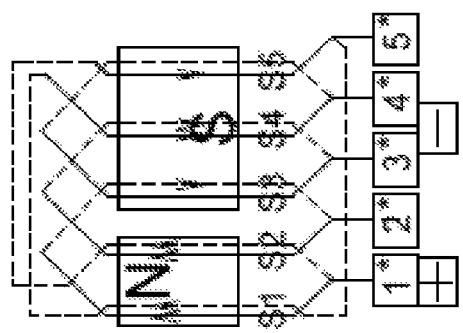
FIG. 22 shows a five segments two pole closed type stator winding where P=5, N=1, R=1, and S=5.

FIG. 22 shows five segments two pole closed type stator winding where P=5, N=1, R=1, and S=5.

Figure 23:
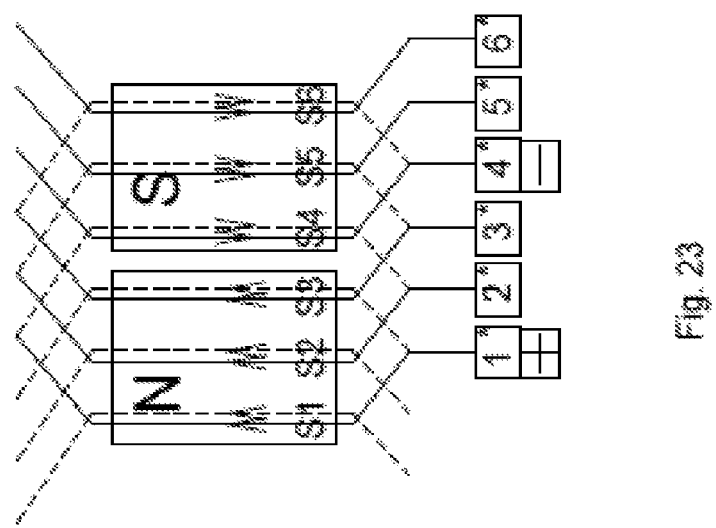
FIG. 23 shows a six segments two pole closed type stator winding where P=6, N=1, R=1, and S=6.

FIG. 23 shows six segments two pole closed type stator winding where P=6, N=1, R=1, and S=6.

Figure 24B:
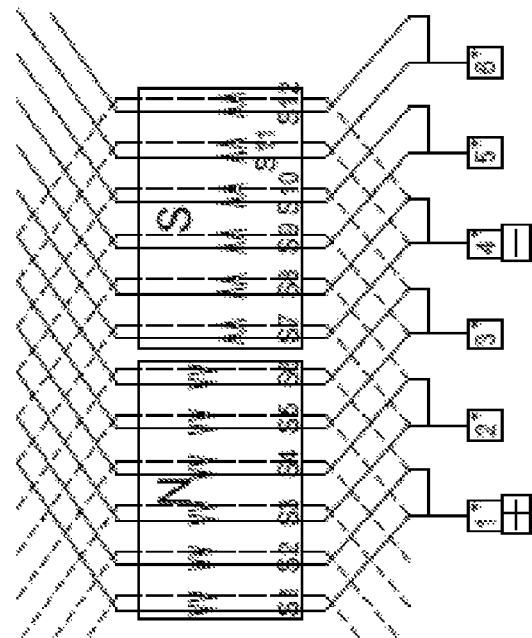
FIGS. 24A-24B show a six segments two pole closed type stator winding where P=6, N=2, R=1, and S=12.
Figure 24A:
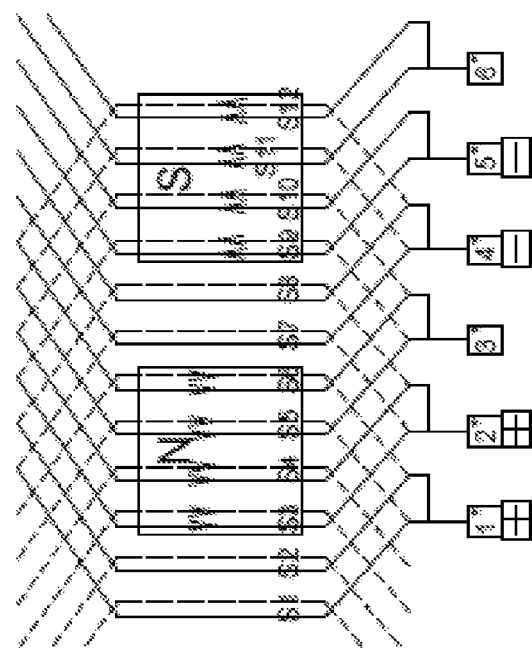
Figure 25:
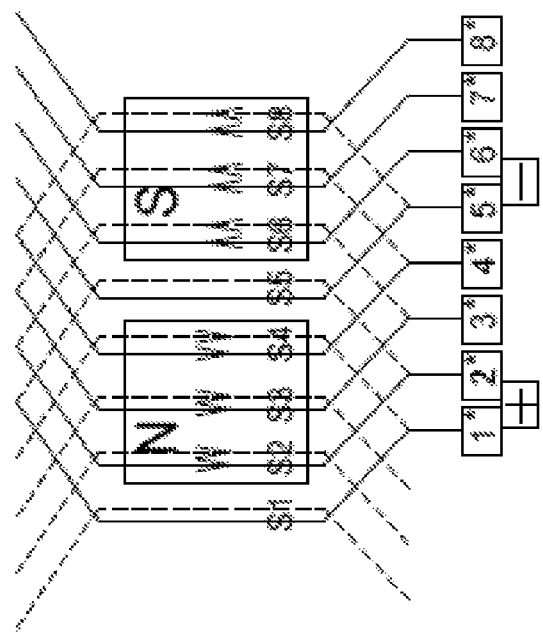
FIG. 25 shows an eight segments two pole closed type stator winding where P=8, N=1, R=1, and S=8.

FIGS. 24A and 24B show six segments two pole closed type stator winding where P=6, N=2, R=1, and S=12. FIG. 24A shows one de-energize step and FIG. 24B shows one energize step FIG. 25 shows eight segments two pole closed type stator winding where P=8, N=1, R=1, and S=8.

Figure 26:
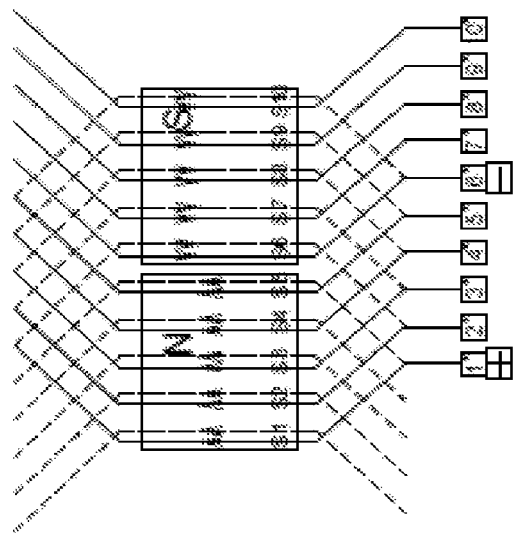
FIG. 26 shows a ten segments two pole closed type stator winding where P=10, N=1, R=1, and S=10.

FIG. 26 shows ten segments two pole closed type stator winding where P=10, N=1, R=1, and S=10.

Figure 27:
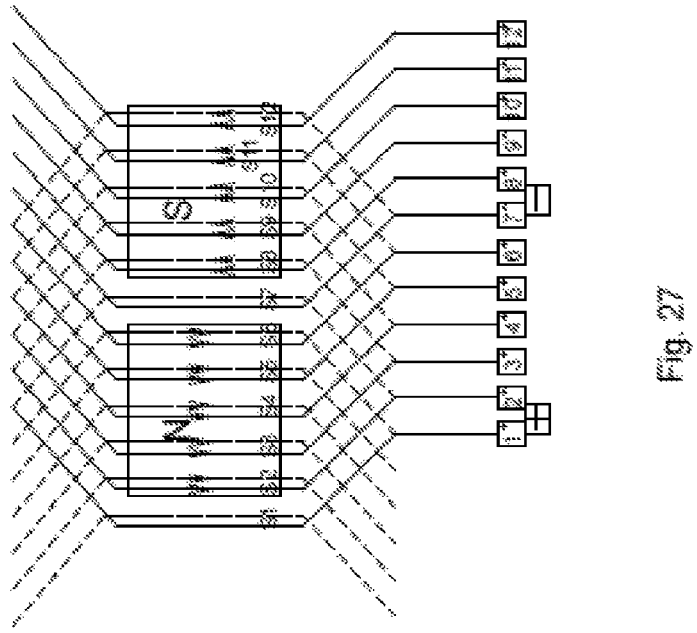
FIG. 27 shows a twelve segments two pole closed type stator winding P=12, N=1, R=1, and S=12.

FIG. 27 shows twelve segments two pole closed type stator winding P=12, N=1, R=1, and S=12.

A method of constructing a first specific example is described in relation to the winding scheme of FIG. 19. A motor stator was constructed by taking apart and rewinding from the beginning an electric sedan traction motor produced by CODA Automotive™ of Los Angeles, Calif. This motor was a QUM™ brand OEM three phase AC motor having a 48 slot stator. It was constructed with three phase lap winding using 52 strand AWG 22 magnet wires for each phase. The rotor for this motor was a 16 pole permanent magnetic type rotor. This motor stator was then re-constructed and re-winded according to the methodology of P=3, N=2, R=8, S=P×N×R=48. The eight three segment coil winding was connected in parallel, each of the three coils in the winding, according to the embodiments described herein, using 36 turns, 2 strand AWG #19 magnet wires and occupies two slots. The commutator used for this reconstructed motor utilized original analog portion of the VFD driver equipped with the sedan, and reprogramed the Arduino Mega microprocessor, with the FIG. 11C commutation sequence.

A method of constructing a second specific example is described as follows. A McLean Engineering™ model K33HXBLS-673 AC induction motor was taken apart and rewound per FIG. 20, to form a four pole squirrel cage type DC induction motor. Here the methodology used was: P=4, N=2, R=2, S=P×N×R=16. The closed type stator winding was internally parallel connected. Each of the eight windings was wound using 10 turns of AWG22 magnet wire. One Atmel™ 328 MCU (ATmega328 8-bit AVR RISC-based microcontroller) was used to drive four electric half bridges to generate the timed commutation sequence FIG. 4A. The half bridge commutated 24 VDC power from the DC power supply to the motor windings to create four rotating magnetic poles on the stator.

A method of constructing a third specific example is described as follows. An Oriental Motor USA™ model E0144-344 AC induction motor was taken apart and reconstructed and rewound from the beginning to form a four pole squirrel cage type DC induction motor. The stator was constructed as 12 segment closed type winding FIG. 27. This winding was internally parallel connected and each segment was connected to one pair of mechanical relays. Here the rotor was a squirrel cage type rotor design. Each of the 24 windings was wound using 16 turns of AWG21 magnet wire. The commutator also used was one Atmel™ 328 MCU (ATmega328 8-bit AVR RISC-based microcontroller) to control the timed commutation sequence. This device commutated DC power from generic 12V DC power supply to the motor windings to create four rotating magnetic poles on the stator.

Motor assembly 100 described herein is similar to a universal motor. The universal motor is so named because it is a type of electric motor that can operate on both AC and DC power. It is a commutated series-wound motor where the stator's field coils are connected in series with the rotor windings through a commutator. The universal motor is very similar to a DC series motor in construction, but is modified slightly to allow the motor to operate properly on AC power. This type of electric motor can operate well on AC because the current in both the field coils and the armature (and the resultant magnetic fields) will alternate (reverse polarity) synchronously with the supply. Hence the resulting mechanical force will occur in a consistent direction of rotation, independent of the direction of applied voltage, but determined by the commutator and polarity of the field coils.

Figures 28A, 28B:
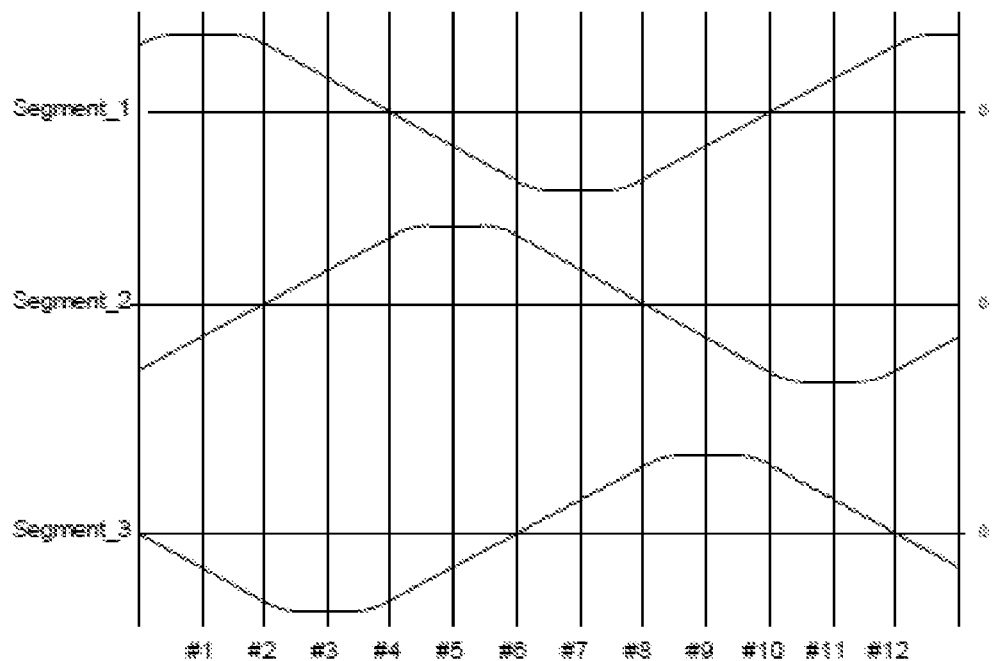
FIG. 28A shows a three phase AC current with artificially predetermined twelve step segments potential points to match the timed commutation sequence shown in FIG. 28B.
Figure 29:
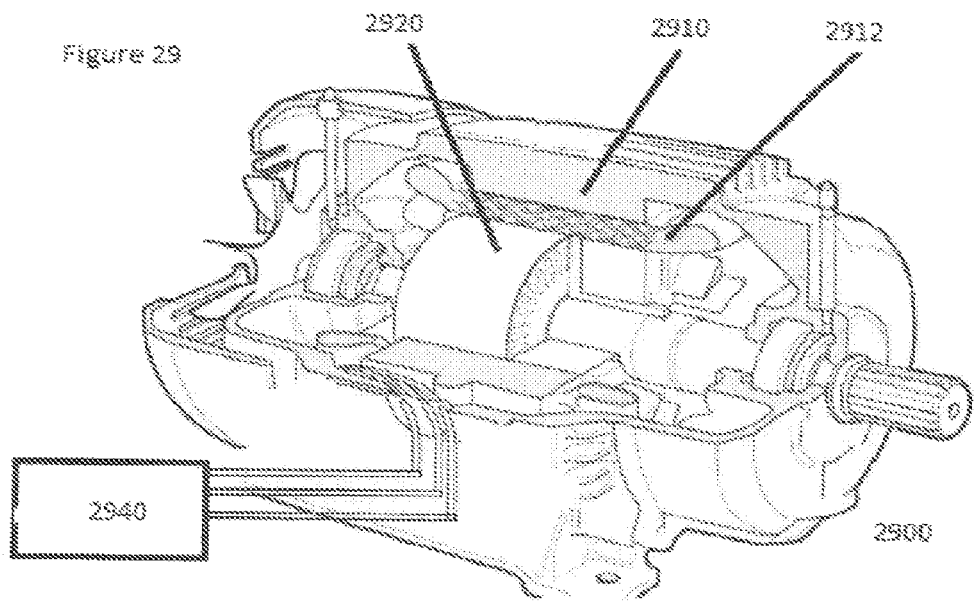
FIG. 29 is a perspective view of an AC motor assembly 2900.

FIG. 28A shows a three phase AC current with artificially predetermined twelve step segments potential points to match the timed commutation sequence shown in FIG. 28B (similar to FIG. 11C) for operation of an AC motor (e.g., AC motor assembly 2900 illustrated in FIG. 29). The three segments closed type stator segments have match potential as if it is commutated with DC, however, now it is AC. This closed type winding can be naturally driven by a three phase off grid utility alternating current (i.e., AC motors are self-commutating as its name stands for alternating current). However this closed type stator winding may be interpreted as a DC commutated winding. It is inherently an AC motor stator winding while driven by a synchronized naturally self-commutating AC. The AC may have a 120 degree phase angle offset. This closed type winding is driven by self-commutating AC current does not need a commutator. The closed type stator winding is AC/DC or universal winding.

FIG. 29 is a perspective view of an AC motor assembly 2900. The AC motor assembly 2900 features a stator 2910, rotor 2920 and coil windings 2912. An AC motor assembly would be manufactured and operated in the same way described herein as DC motor assembly 100 with the same varying number of slots. As discussed in connection with DC motor assembly 100, the rotor 2920 can rotate inside the stator 2910 in response to stator rotating magnetic fields created by the coil windings 2912. Very similar in structure to the DC motor except the AC motor does not have a commutator but rather instead the speed of the AC motor assembly 2900 is controlled by a variable frequency driver 2940 (shown external to the AC motor assembly 2900 but in alternative embodiments may be located inside the AC motor assembly).

A generator assembly would be manufactured and operate in the same way described herein as DC motor assembly 100 and AC motor assembly 2900.

As discussed, some of the benefits of the electric motors 100 and 2900 disclosed herein with reference to FIGS. 1A-29 may include the following. First, an electric motor that can operate at very high starting torque because the coils are fully energized with DC current. This is generally comparable to the starting torque provided by a brush type DC electric motor with permanent magnetic field, but without the drawbacks of brushes inside the motor body. Second, an electrical motor with a rotational speed that can be precisely controlled because the rotation is progressed by timed commutation sequence steps. Such steps are precisely controlled (for example by accurately timed electronics and/or electronic processors) to a very high degree of accuracy. Third, an electric motor that operates at higher efficiency and power density. This is because the improved electrical motor stator can operate without brush related contact loss and the winding is on the stator and easier to dissipate heat, thereby creating less heat and improving efficiency. Fourth, an electric motor capable of operating with AC current or DC current with commutation. It is more capable of variable speeds at higher efficiencies than prior art AC motors powered by variable frequency drives (VFD). This is because the motor avoids problems due to various VFD effects, such as higher frequency pulse width modulation (PWM) switching loss, AC skin effects, and motor total harmonic distortion (THD) related core losses. Fifth, in some alternative embodiments, where the stator and rotator can be viewed as having an almost infinite diameter meaning that there are no set limits on the number of slots, there is also provided an improved linear DC electric motor as well. Sixth, in some alternative embodiments, when paired with a permanent magnetic rotor or squirrel cage rotor, there also may be provided a regenerative motor, and act as a generator (based on Faraday's law of induction) when external power is applied to the rotor. Seventh, other embodiments described herein can also be applied in other types of electromechanical devices as well, such as rotating magnetic bearings. Indeed any type of electromechanical device where AC rotating magnetic fields are used may potentially be improved according to the motors and methods described herein. Eighth, with up to four steps per slot count commutation resolution when commutated, the stator winding with timed commutation sequence together create a step motor, the stator winding. Ninth, with a commutator placed outside the motor body, the DC motor can be built enclosed. Traditional DC motors can be replaced by the motors disclosed herein with much reduced maintenance cost. For example, the commutator body can be easily replaced without ever opening the motor body. Tenth, with end coil equally contributing to build the stator magnetic field, the motors disclosed herein are more energy efficient and have more power density. Tenth, with end coil equally contribute to create stator magnetic field, this closed type stator winding saves copper. Eleventh, the motors disclosed herein are DC motors while commuted with the timed commutation sequence and have the advantage of traditional DC brush motor high starting torque and precision speed control of AC motor. Twelfth, the electric motors are AC motors when powered by utility AC or off the shelf VFDs. Thirteenth, the electric motors are stepper motors with four steps per slot. Fourteenth, the electric motor disclosed herein is a reluctant motor if fit with a reluctant rotor (i.e., a reluctant motor is a type of electric motor that induces non-permanent magnetic poles on a ferromagnetic rotor). Fifteenth, in the electric motors of this disclosure because current from a collapsing magnetic field flows to low electric potential on the closed type stator winding, there is no penalty for DC current switching. Sixteenth, the electric motor is a high power true brushless DC, stepper and reluctant motor which can be built with the simple control nature of DC current.

The motor embodiments described herein provide an improved high power density, high torque traction motor. This motor may be suitable for road and track vehicles, marine vessel, railways, trolleys, subways, and other applications where high torque, high power, and high efficiency is useful. Such motors may also be used for automobiles, appliances, industrial automations, medical devices, power tools robotics or any application that converts electric energy to kinetic energy.

The foregoing described embodiments have been presented for purposes of illustration and description and are not intended to be exhaustive or limiting in any sense. Alterations and modifications may be made to the embodiments disclosed herein without departing from the spirit and scope of the invention. No language in the specification should be construed as indicating any non-claimed element as essential to the practice of the invention. The actual scope of the invention is to be defined by the claims.

The definitions of the words or elements of the claims shall include not only the combination of elements which are literally set forth, but all equivalent structure, material or acts for performing substantially the same function in substantially the same way to obtain substantially the same result.

The words used in this specification to describe the invention and its various embodiments are to be understood not only in the sense of their commonly defined meanings, but to include by special definition in this specification any structure, material or acts beyond the scope of the commonly defined meanings. Thus if an element can be understood in the context of this specification as including more than one meaning, then its use in a claim must be understood as being generic to all possible meanings supported by the specification and by the word itself.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred. Where a process is described in an embodiment the process may operate without any user intervention.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

Neither the Title (set forth at the beginning of the first page of the present application) nor the Abstract (set forth at the end of the present application) is to be taken as limiting in any way as the scope of the disclosed invention(s). The title of the present application and headings of sections provided in the present application are for convenience only, and are not to be taken as limiting the disclosure in any way.

The invention claimed is:

1. A method for commutating an electric motor comprising:
   producing a stator rotating magnetic field from a closed type winding of a stator including at least three coils coupled with a rotor magnetically, the rotor capable of rotating when induced by the stator rotating magnetic field;
   controlling the stator rotating magnetic field with a commutator through a timed commutation sequence;
   wherein the stator and the at least three coils are configured so that energy released from a collapsing stator rotating magnetic field on a de-energizing commutation step in a first of the at least three coils is captured by a second of the at least three coils energized on a next step of an energizing commutation step;
   wherein the timed commutation sequence is configured so that when a first commutation step is commanded and the rotor is induced to a first detected position then a second commutation step is commanded so that the rotor is induced to a second detected position; and
   wherein the timed commutation sequence is commutated to cause rotation of the stator rotating magnetic field so that each phase of an electric potential is at least 150 electric degrees positive and at least 150 electric degrees negative, wherein an electric potential of a first phase has approximately 120 electric degrees advance of a second phase and has approximately 240 electric degrees advance of a third phase.

2. The method of claim 1 wherein an energizing commutation step is at both ends of the second of the at least three coils which is commutated to more differential potential and changes the current flow pattern in the closed type winding so as to advance the stator rotating magnetic field by a commutation step in the timed commutation sequence.

3. The method of claim 1 wherein at the de-energizing commutation step, the current generated from part of a collapsing stator rotating magnetic field continuously flows in the direction of a previous current direction to a lowest electric potential inside the closed type stator winding until part of the collapsing stator rotating magnetic field is substantially collapsed and the current generated from the part of the collapsing stator rotating magnetic field advance stator rotating magnetic field in a next step of the timed commutation sequence.

4. The method of claim 1, wherein the stator rotating magnetic field advances at least one step at a time to generate a time varying geometrically separated magnetic field according to the timed commutation sequence.

5. The method of claim 1, wherein the timed commutation sequence is a twelve step commutation sequence.

6. The method of claim 1, wherein the electric motor can be used in any of the group consisting of: an electric motor, a railway engine, a trolley engine, a subway engine, an electric vehicle motor, a vehicle's auxiliary motor, an industrial automation control motor, an aviation vehicle, a marine vessel, a robotic machine, an automobile, an appliance, industrial automation equipment, a medical device, and a power tool.

7. The method of claim 1, wherein the timed commutation sequence is a six step commutation sequence.

8. The method of claim 1, wherein the commutator is Insulated Gate Bipolar Transistors (IGBT) or metal-oxide-semiconductor field-effect transistors (MOSFET).

9. The method of claim 1, wherein the commutator is a rotary mechanical commutator.

10. A method for commutating an electric motor comprising:
    producing a stator rotating magnetic field from a closed type winding of a stator including at least four coils coupled with a rotor magnetically, the rotor capable of rotating when induced by the stator rotating magnetic field;
    controlling the stator rotating magnetic field with a commutator through a timed commutation sequence;
    wherein the stator and the at least four coils are configured so that energy released from a collapsing stator rotating magnetic field on a de-energizing commutation step in a first of the at least four coils is captured by a second of the at least four coils energized on a next step of an energizing commutation step;
    wherein the timed commutation sequence is configured so that when a first commutation step is commanded and the rotor is induced to a first detected position then a second commutation step is commanded so that the rotor is induced to a second position; and
    wherein the commutator is a plurality of switches commutated to cause rotation of the stator rotating magnetic field so that each phase of an electric potential is approximately 135 electric degrees positive and approximately 135 electric degrees negative wherein an electric potential of a first phase has approximately 90 electric degrees advance of a second phase and has approximately 180 electric degrees advance of a third phase and approximately 270 degrees advance of a fourth phase.

11. The method of claim 10, wherein the commutator is one of the group consisting of Insulated Gate Bipolar Transistors (IGBT) or metal-oxide-semiconductor field-effect transistors (MOSFET).

12. The method of claim 10, wherein the commutator is a rotary mechanical commutator.

13. The method of claim 10, wherein an energizing commutation step is at both ends of the second of the at least four coils which is commutated to more differential potential and changes the current flow pattern in the closed type winding so as to advance the stator rotating magnetic field by a commutation step in the timed commutation sequence.

14. The method of claim 10, wherein at the de-energizing commutation step, the current generated from part of a collapsing stator rotating magnetic field continuously flows in the direction of a previous current direction to a lowest electric potential inside the closed type stator winding until part of the collapsing stator rotating magnetic field is substantially collapsed and the current generated from the part of the collapsing stator rotating magnetic field advance stator rotating magnetic field in a next step of the timed commutation sequence.

15. The method of claim 10, wherein the stator rotating magnetic field advances at least one step at a time to generate a time varying geometrically separated magnetic field according to the timed commutation sequence.

16. The method of claim 10, wherein the timed commutation sequence is a sixteen step commutation sequence.

17. The method of claim 10, wherein the timed commutation sequence is a eight step commutation sequence.

18. The method of claim 10, wherein the electric motor can be used in any of the group consisting of: an electric motor, a railway engine, a trolley engine, a subway engine, an electric vehicle motor, a vehicle's auxiliary motor, an industrial automation control motor, an aviation vehicle, a marine vessel, a robotic machine, an automobile, an appliance, industrial automation equipment, a medical device, and a power tool.

* * * * *